166-117.
7/23/87 RE 32,441

United States Patent [19]
Higgins et al.

[11] E Patent Number: Re. 32,441
[45] Reissued Date of Patent: Jun. 23, 1987

[54] SIDE POCKET MANDREL AND METHOD OF CONSTRUCTION

[75] Inventors: Robert S. Higgins, Sand Springs, Okla.; David T. Merritt, Frisco, Tex.

[73] Assignee: Otis Engineering Corporation, Dallas, Tex.

[21] Appl. No.: 801,920

[22] Filed: Nov. 25, 1985

Related U.S. Patent Documents

Reissue of:
[64] Patent No.: 4,333,527
Issued: Jun. 8, 1982
Appl. No.: 148,928
Filed: May 12, 1980

U.S. Applications:
[63] Continuation-in-part of Ser. No. 86,723, Oct. 22, 1979, abandoned, which is a continuation-in-part of Ser. No. 77,184, Sep. 20, 1979, abandoned.

[51] Int. Cl.[4] ..... E21B 23/03
[52] U.S. Cl. ..... 166/117.5; 228/168; 228/173.4
[58] Field of Search ..... 166/117.5, 325, 328; 285/132, 137 A; 29/DIG. 26, 157 R, 558; 228/173.4, 168, 216

[56] References Cited

U.S. PATENT DOCUMENTS

| | | | |
|---|---|---|---|
| 1,906,312 | 5/1933 | Burt | 166/328 |
| 2,813,587 | 11/1957 | Mounce | 166/325 X |
| 2,846,014 | 8/1958 | Daffin et al. | 166/102 |
| 2,970,648 | 2/1961 | Daffin et al. | 166/115 |
| 3,040,814 | 6/1962 | Daffin | 166/313 |
| 3,096,825 | 7/1963 | Clark, Jr. | 166/325 |
| 3,100,452 | 8/1963 | Grimmer et al. | 137/155 |
| 3,102,590 | 9/1963 | Grounds | 166/325 |
| 3,223,109 | 12/1965 | Cummings | 137/155 |
| 3,334,697 | 8/1967 | Edwards et al. | 166/325 |
| 3,380,760 | 4/1968 | McArthur et al. | 287/137 A |
| 3,662,447 | 5/1972 | Schweng | 29/DIG. 26 |
| 3,796,259 | 3/1974 | Outhouse | 166/117.5 |
| 3,825,285 | 7/1974 | McArthur et al. | 287/137 A |
| 3,837,398 | 9/1974 | Yonker | 166/117.5 |
| 3,890,025 | 8/1975 | Dinning | 166/117.5 |
| 4,066,128 | 1/1978 | Davis et al. | 166/117.5 |
| 4,106,564 | 8/1978 | Tausch | 166/117.5 |
| 4,135,576 | 1/1979 | Tausch | 166/117.5 |

FOREIGN PATENT DOCUMENTS

| | | | |
|---|---|---|---|
| 864160 | 3/1961 | United Kingdom | 166/117.5 |

*Primary Examiner*—James A. Leppink
*Assistant Examiner*—Hoang C. Dang
*Attorney, Agent, or Firm*—Albert W. Carroll

[57] ABSTRACT

An improved side pocket mandrel having a body comprising a one-piece main body section in which a main bore and a receptacle bore extend longitudinally therein and an upper body section having space therein for operating a kickover tool, welded together with a circumferential weld. In another embodiment, the machined main body section is welded by circumferential welds between upper and lower body sections. Additional embodiments are further disclosed having means therein for orienting kickover tools which are run and manipulated by wire line or pump down techniques and also having deflectors therein for deflecting regular well tools back into the main passage when approaching the receptacle from above and yet guiding flow control devices into the receptacle when such device is moved laterally into alignment with the receptacle by a kickover tool. Some disclosed embodiments have check valve means controlling flow between the exterior and the interior thereof.

Methods for constructing such side pocket mandrels and methods of welding tubular members, such as body sections of such mandrels, together with circumferential welds are also disclosed.

10 Claims, 36 Drawing Figures

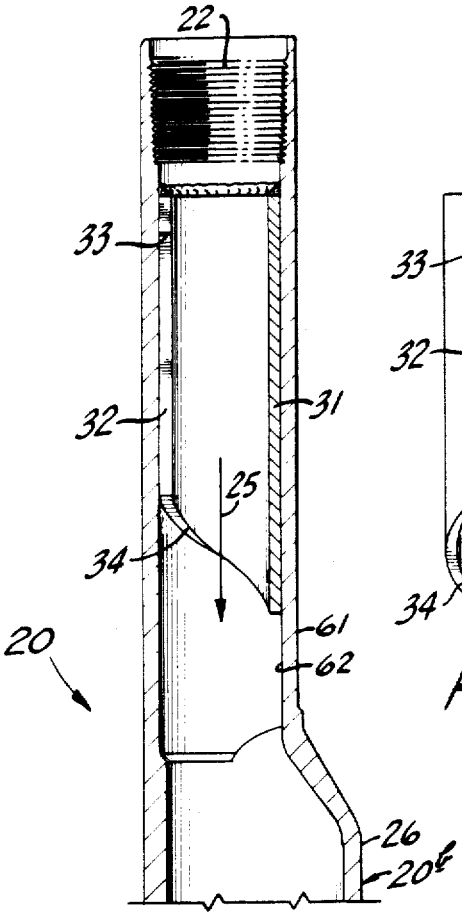
FIG. 1-A
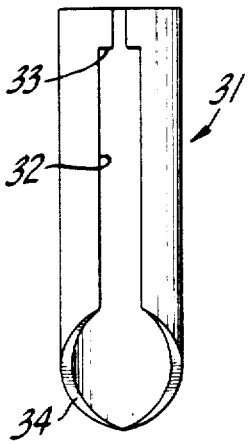
FIG. 4
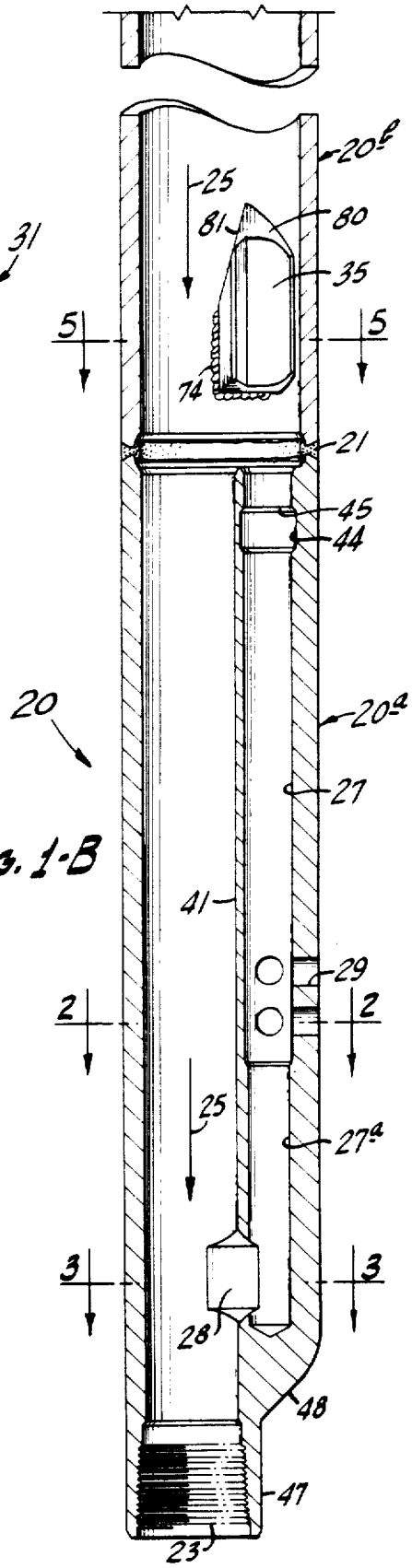
FIG. 1-B
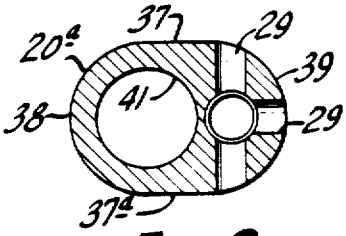
FIG. 2
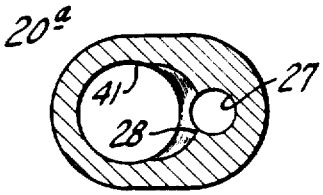
FIG. 3

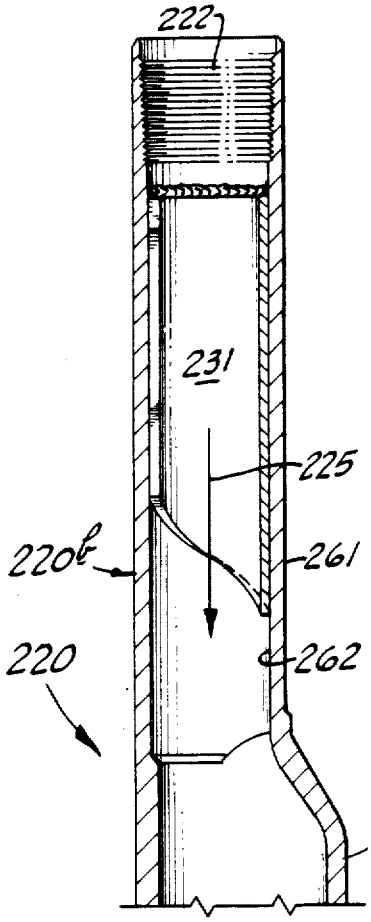
FIG. 10-A
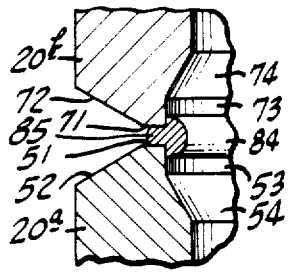
FIG. 6
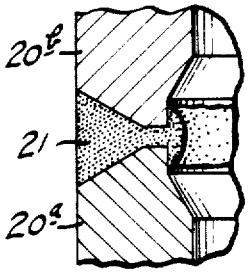
FIG. 7
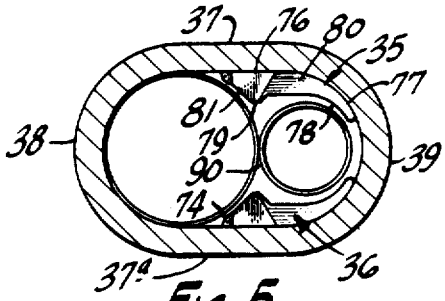
FIG. 5
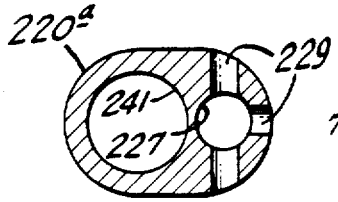
FIG. 11
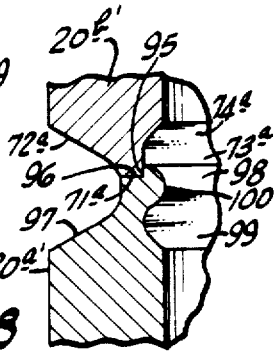
FIG. 8
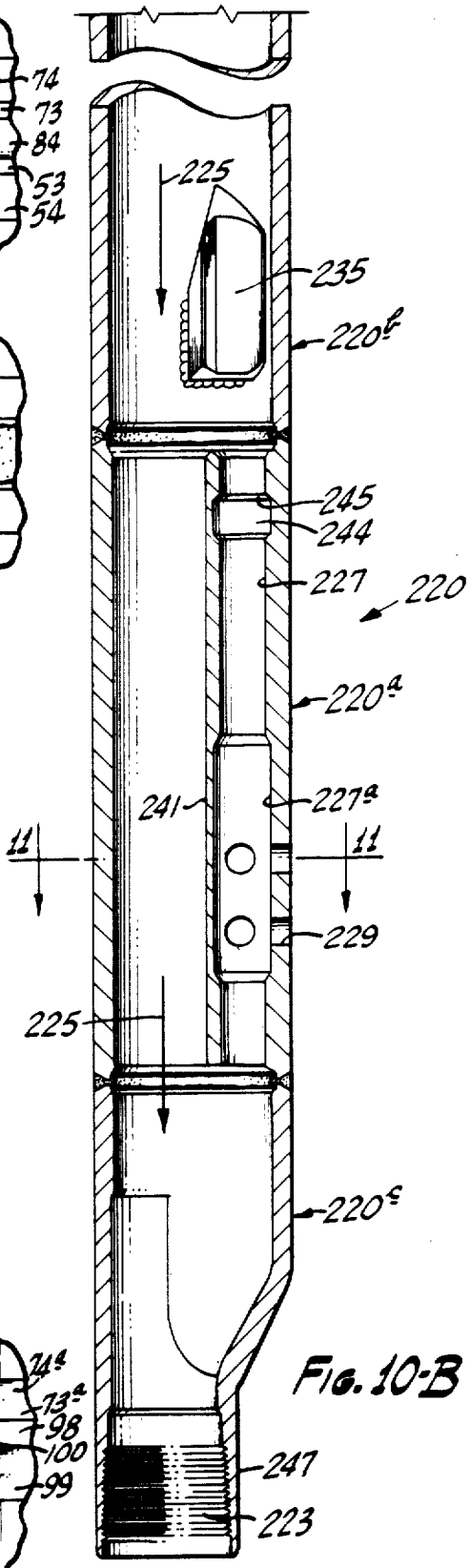
FIG. 10-B

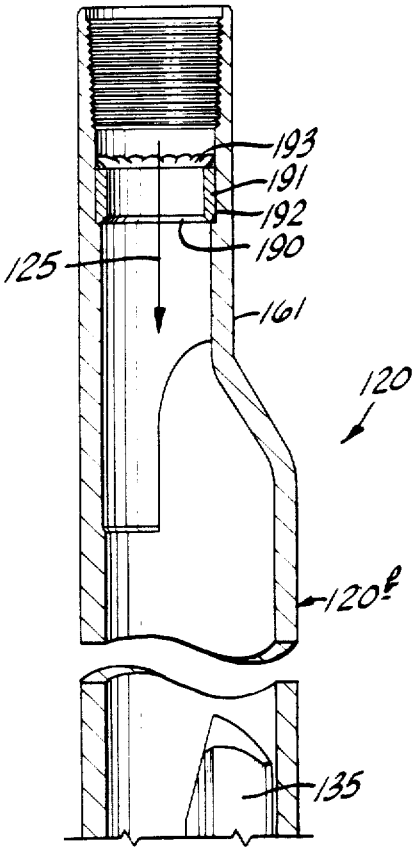
FIG. 9-A
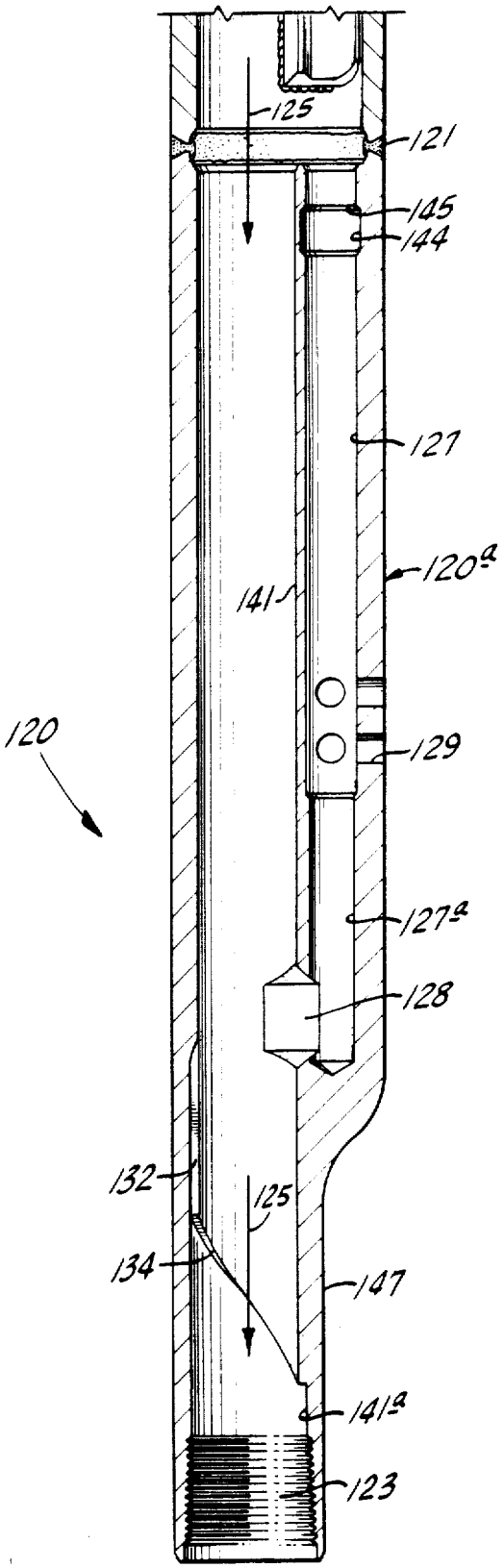
FIG. 9-B

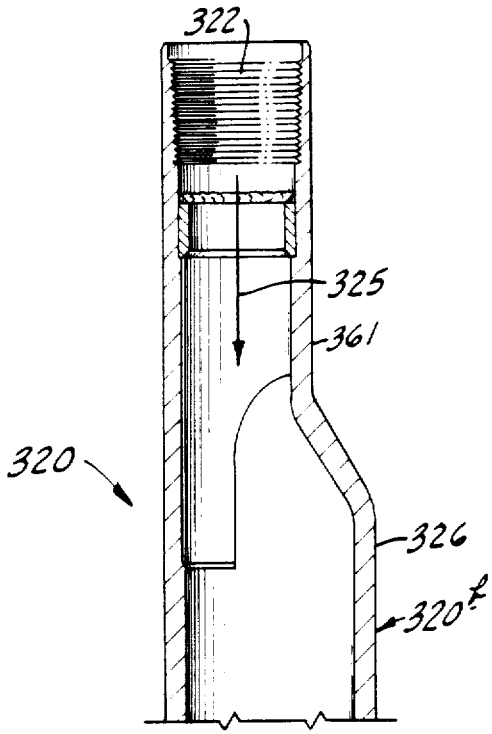
FIG. 12-A
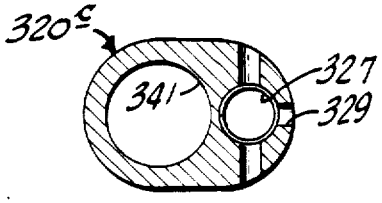
FIG. 15
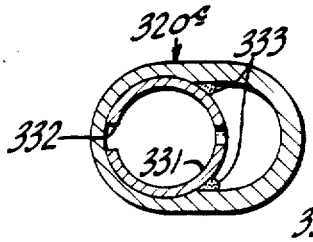
FIG. 14
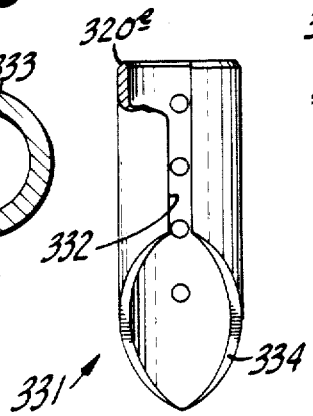
FIG. 13
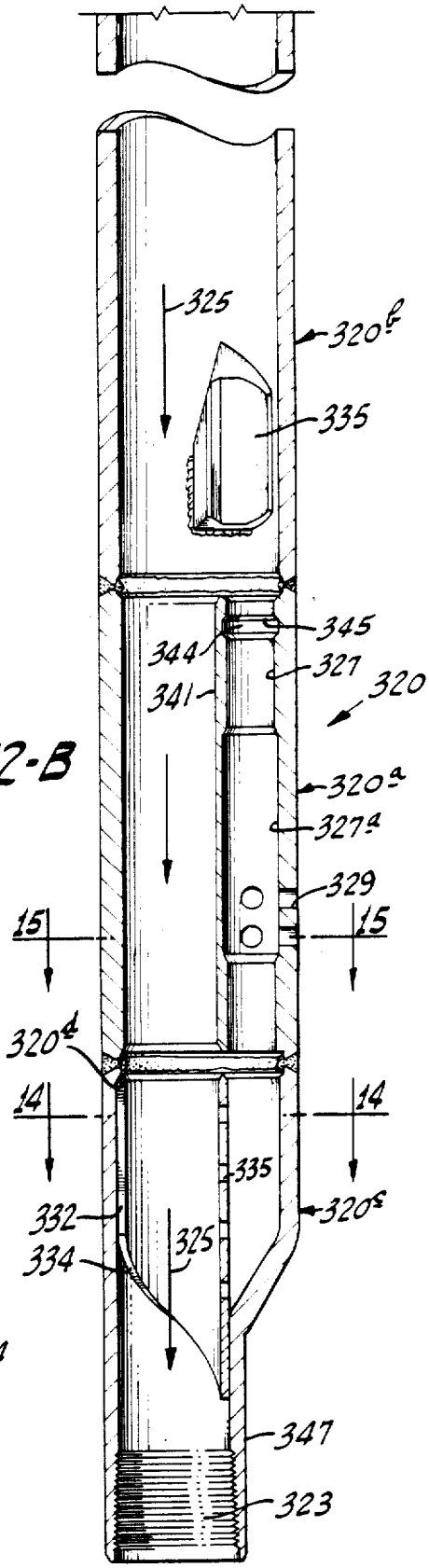
FIG. 12-B 412
411
418
417
435
663
436
401
400
433
430
433d
430d
412
411
404
434
431
434d
431d
432
432d
424
426
425
423
415
405
402
422
414
406
403

676
630
675
666
665
663
641
664
627
629

466
466d
466a
462
466c
472b
465
464
468
469
471
471a
470a
467
470b 476
465
475
475a
430a 475
475a
466a
430a
476
477
461
466
462
466d
430
473
465
464
430g
460
427
441
429

430d 462
430
441
427
429

490

430
435
427
430d
430a
18
18
441

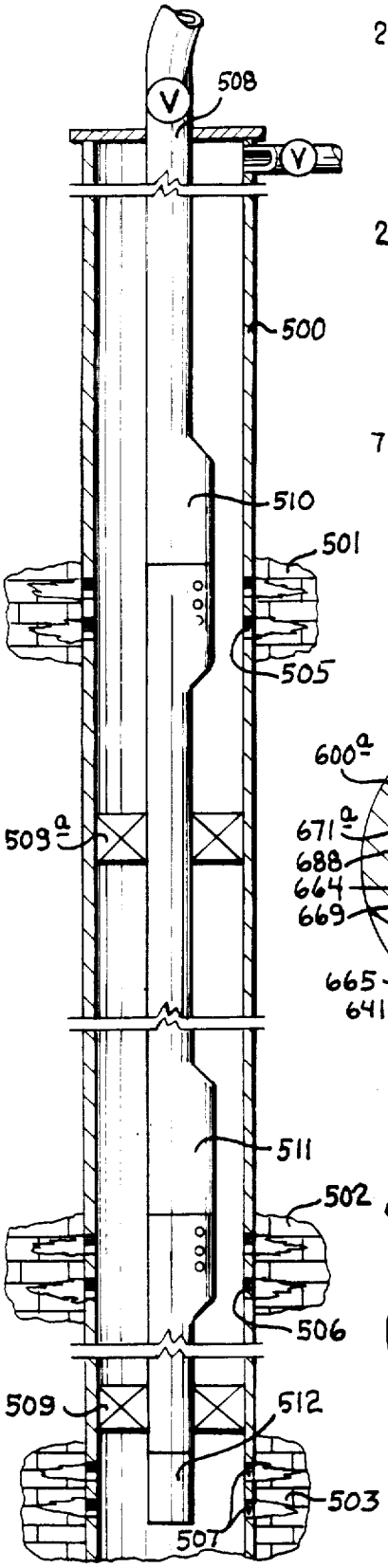
FIG. 22
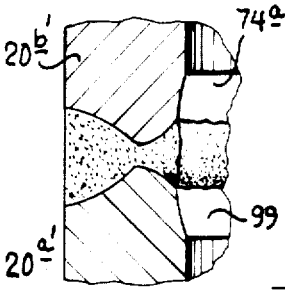
FIG. 28
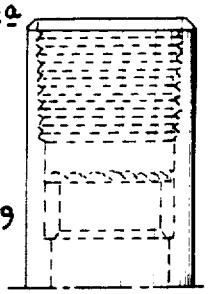
FIG. 23-A
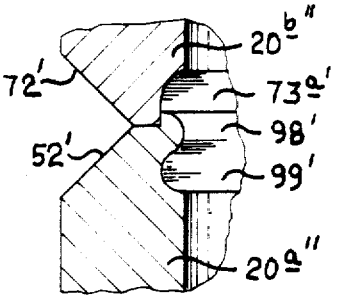
FIG. 27
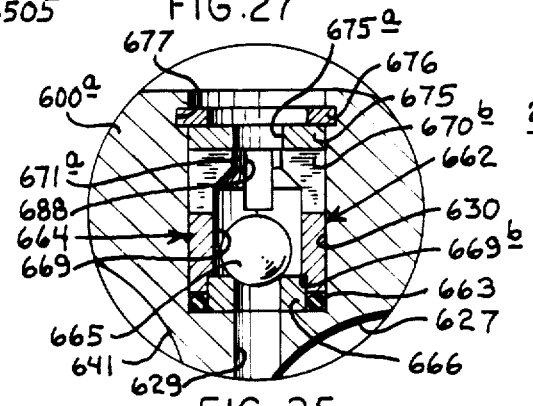
FIG. 25
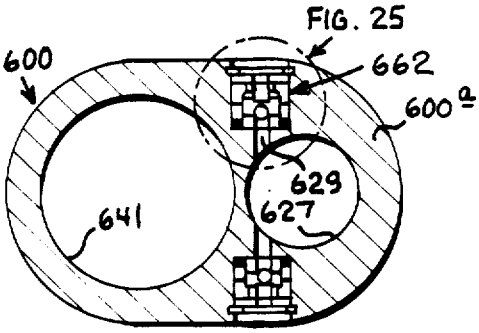
FIG. 24
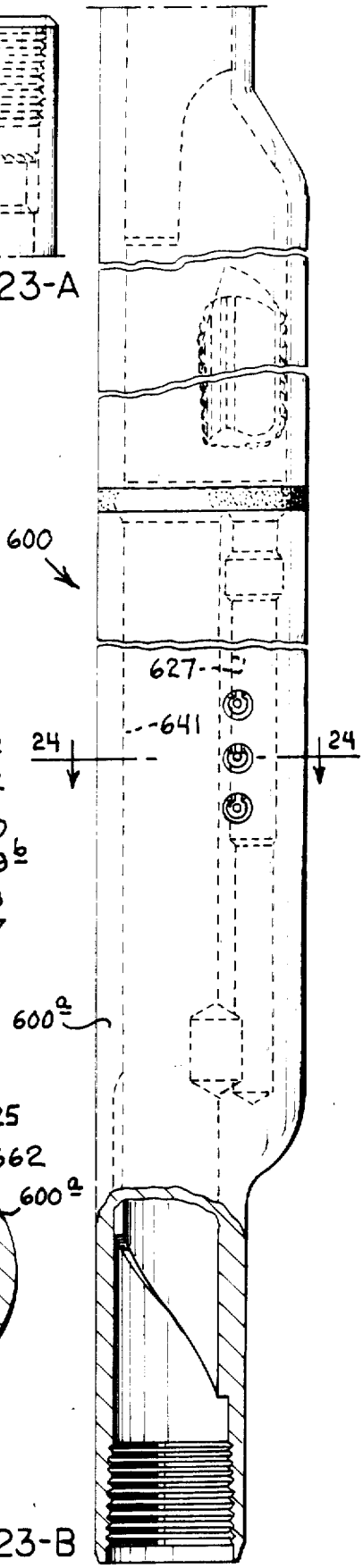
FIG. 23-B

SIDE POCKET MANDREL AND METHOD OF CONSTRUCTION

Matter enclosed in heavy brackets [ ] appears in the original patent but forms no part of this reissue specification; matter printed in italics indicates the additions made by reissue.

This application for patent is a continuation-in-part of U.S. application Ser. No. 86,723, filed Oct. 22, 1979, now abandoned which application is a continuation-in-part of U.S. application Ser. No. 77,184 filed Sept. 20, 1979, now abandoned.

BACKGROUND OF THE INVENTION

1. Field of the Invention

This invention relates to gas lift apparatus and more particularly to side pocket mandrels for use in wells produced by gas lift techniques and to methods of constructing side pocket mandrels.

2. Description of the Prior Art

Generally, side pocket mandrels have been constructed with elongate tubular bodies having a window in the side thereof and a side pocket receptacle body welded in the window so that the receptacle bore is positioned inside the mandrel for receiving flow control devices while a portion of the receptacle body is exposed through the window and is provided with lateral communication ports for conducting fluid flow between the receptacle bore and the exterior of the mandrel. Such construction requires welds in which at least a portion thereof extends longitudinally of the mandrel. Examples of such construction are illustrated in U.S. Pat. Nos. 2,824,525, 2,948,341, 3,412,806, 3,666,012, 2,942,671, 3,040,814, 3,606,393, 3,727,684, 3,741,299, 3,827,489, 3,994,339, 4,106,563, 3,802,503, 3,827,490, 4,030,543, 4,106,564, 3,807,498, Re. 29,870, 4,031,954, 4,135,576, 3,807,499, 3,874,445, 4,034,806, 4,146,091.

Some side pocket mandrels have utilized circumferential butt welds in their construction to join adjacent tubular members together. Examples of such welds are seen in U.S. Pat. Nos. 3,788,397, 3,827,490, 4,135,576, 4,146,091. But such circumferential welds are simply butt welds which join adjacent tubular members in end-to-end relationship.

Some side pocket mandrels are provided with deflector means extending above the receptacle bore for deflecting ordinary well tools moving through the mandrel back into the main flow passage to avoid possibility of lodging on or in the side pocket receptacle and yet permitting and even guiding a flow control device into the receptacle, thus facilitating its installation. Some of these deflectors are integral with the receptacle body, and some are welded to the upper end thereof. Most of the deflectors which are thus attached to the receptacle body tend to result in a longer window in which it is welded by a longer seam, this extra length being added to the longitudinal dimension of the seam.

Over the many years that such mandrels have been in use, many failures have occurred. Most of these failures occurred at longitudinal structural welds. Most of the weld failures occurred in the longitudinal portion of the seam. The term "structural weld," as used herein, denotes weld seams which form a structural part of the side pocket mandrels. These structural welds are subject to stresses created in the mandrels as a result of forces applied thereto as a result of tensile, columnal, or torsional loads, and are subject to pressures inside and outside the mandrels. Failure of such weld will at least cause a leak in the mandrel. Thus, the term "structural weld" as used herein also includes plug welds.

Failure in such welds is more readily understood in mandrels which are non-circular in cross section. Non-circular mandrels, which include the oval shaped and the flattened, appeared long ago, and for the last 10–15 years a very high percentage of the mandrels in use are non-circular. These are desired over the circular ones because two such mandrels will fit side by side or can pass each other in a smaller well casing, other things being equal. Or, alternatively, larger non-circular mandrels can be used in dual wells for some given casing sizes.

When side pocket mandrels, and especially non-circular ones, having longitudinal structural weld seams in the wall thereof, are subjected to high internal or external pressures, the lateral walls tend to expand or collapse, as the case may be. This expansion or collapsing movement of the mandrel wall results in very high stress concentrations at the longitudinal welds. It is extremely difficult, if not impossible, to obtain welds in such places that (1) do not have a notch at the inner side where the inner wall of the mandrel meets the outer wall of the receptacle body, and (2) do have full weld penetration.

Therefore, longitudinal structural welds provide weak places in such mandrels and are a source of early failure under severe or even ordinary conditions.

Also, many side pocket mandrels have been equipped with deflectors which have been joined to the mandrel through use of plug welds. In a similar manner, many mandrels have been equipped with orienting sleeves for orienting kickover tools, which sleeves have often been attached inside the mandrel by plug welds. Plug welds, while often used in the manufacture of side pocket mandrels, seldom appear in patents. What appear to be plug welds appear in U.S. Pat. No. 3,827,490.

Plug welds have also caused many failures. Since such welds are accomplished by welding a part such as a deflector or orienting sleeve to the inner wall through a hole in the mandrel wall, such hole resembles a window and at least a portion of the seam around the window will be longitudinal in direction relative to the mandrel. Thus, it is believed that failure occurs at a plug weld for the same reasons that failure occurs at a window. While the hole for the plug weld is smaller than the window in the window weld, the notch effect at the weld is somewhat similar.

U.S. Pat. No. 3,606,393 shows a receptacle body which has been made especially heavy in an effort to strengthen the window area and reduce weld failure, the increased mass of the material in the receptacle body being intended to prevent wrapping as a result of the welding, but the notch effect is still attendant, together with wall flexure under pressure in burst or collapse, and failures still occur.

Warpage of the mandrel as a result of welding has also been a problem in the manufacture of side pocket mandrels. This occurs, of course, because the hot weld metal shrinks upon cooling. Shrinkage is largely dependent upon the quantity of weld metal deposited. Thus, long axially extending seams warp more than short ones. When these seams are not opposite one another but are closer to one side of the mandrel, as they generally are in the case of a lateral window, especially a long narrow window, warpage can be considerable.

The stresses induced into the mandrel body by shrinking weld seams can literally destroy the mandrel, but these stresses can be relieved by hearing the entire mandrel in a process known as normalizing. This process does not, however, remove the warpage, and the mandrel must be straightened by bending in a direction opposite that of the warp. This straightening process leaves the mandrel, then, with certain residual stresses therein, but, comparatively speaking, it is operable and is far more acceptable than before.

It should be understood that while a certain amount of stresses may be acceptable in a mandrel, it would be ideal to eliminate them entirely since they tend to facilitate certain corrosion processes.

U.S. Pat. No. 3,086,593 to Chitwood shows a check valve disposed in the flow passage extending through a gas lift valve which is installed in the offset receptacle of a side pocket mandrel to prevent back flow therethrough. Such check valves have been in common use. Similar check valves have been incorporated in such devices which are check valves per se and are not gas lift valves. These valves, when removed from the receptacle, leave the lateral ports thereof open for free movement of fluids therethrough in either direction.

Prior art drawing, Drawing No. 211—134 of Otis Engineering Corporation, P.O. Box 34380, Dallas, Texas 75234, shows a check valve disposed in a flow passage which is in direct communication with the extreme lower end of the offset receptacle of a side pocket mandrel. This check valve is not removable and, therefore, remains effective at all times, even when the receptacle bore is vacant, but this type of side pocket mandrel has very limited application because it is not compatible with conventional gas lift valves. In this type of mandrel, the lower end of the receptacle bore communicates with the exterior of the mandrel; in conventional mandrels, the lower end of the receptacle bore communicates with the main bore of the mandrel. In conventional gas lift valves for side pocket mandrels, lift gas enters the side of the valve and exits through its lower end into the lower portion of the receptacle bore. In the conventional side pocket mandrel, the receptacle bore is always drained and gas lift valves can be installed therein without difficulty. In mandrels where the lower end of the receptacle bore communicates with the exterior of the mandrel and a check valve is disposed in such communication passage, as in Otis Engineering Drawing No. 211—134 mentioned above, liquids can collect in the receptacle bore and the check valve will prevent their being drained, and installation of gas lift valves or other devices may be difficult or impossible because of such trapped liquids.

None of the prior art known to applicants shows a check valve in the lateral port of a side pocket mandrel, the lateral port being in direct communication with the receptacle bore at a location intermediate its ends, that is, at its mid section where devices can seal both above and below such lateral port.

The present invention overcomes the problems and shortcomings discussed above by providing side pocket mandrels and methods for their construction in which longitudinal structural weld seams, including window welds and plug welds, are eliminated entirely and warpage and straightening are minimized while providing a product which is constructed with ease and is stronger and less susceptible to failure. This invention also overcomes the check valve problem by providing check valve means in the lateral ports of the mandrels to control back flow through the lateral ports.

SUMMARY OF THE INVENTION

The present invention is directed to side pocket mandrels having means on opposite ends thereof for connection into a string of well tubing and comprising a one-piece machined main body section and an upper body section welded together by a circumferential weld, the main body section providing a full opening main bore and a machined receptacle bore extending alongside thereof and the upper body section having a belly providing space above the receptacle bore for operation of a kickover tool, such mandrels being provided as desired with means for orienting and activating kickover tools and with deflector means for directing flow control devices into the receptacle bore and directing regular well tools into the main bore. The present invention is also directed to methods of constructing such side pocket mandrels including the method of welding their tubular body sections together, also to side pocket mandrels constructed by such methods, some such mandrels also being provided with check valve means for controlling flow through the mandrels' lateral ports.

It is therefore one object of this invention to provide an improved side pocket mandrel having a one-piece main body section in which a full opening main bore extends therethrough and a receptacle bore is machined therein alongside the main bore.

Another object of this invention is to provide such a side pocket mandrel in which the main body section is provided with means for attachment to a well tubing and is welded by a circumferential weld to an upper body section also having means thereon for attachment to a well tubing.

Another object of this invention is to provide a side pocket mandrel of the character just described wherein an orienting sleeve is provided and is welded or brazed in position surrounding the main passage in the mandrel, such welding being done by access through the upper open end of the mandrel, such brazing being done in a furnace.

Another object is to provide a side pocket mandrel of the character just described werein orienting means is formed in the main bore integral with the main body section.

Another object is to provide a side pocket mandrel of the character described wherein deflector means is welded to the inner wall of the upper body section before the main body section is welded thereto.

Another object of the invention is to provide an improved side pocket mandrel having a one-piece main body section in which a full opening main bore extends therethrough and a receptacle bore is machined therein alongside the main bore and upper and lower body sections are welded by circumferential welds to the upper and lower ends of the main body section, and wherein the upper and lower body sections have means for attachment to a well tubing.

Another object is to provide a side pocket mandrel of the character just described wherein an orienting sleeve is welded or brazed into the upper body section, such welding being done by access through the upper open end of the mandrel, such brazing being done in a furnace.

Another object is to provide a side pocket mandrel of the character described in which an orienting sleeve is welded inside the lower body section, such welding being done through the open upper end of the lower body section before such section is welded to the main body section.

Another object of this invention is to provide a method of constructing an improved side pocket mandrel by forming a one-piece main body section by machining a full opening main bore therethrough, machining a receptacle bore in the main body alongside the main bore, and forming means on its lower end for attachment to a well tubing, forming an upper body section with a main passage therethrough and a belly or space therein above said receptacle bore for operating a kickover tool and means on its upper end for attachment to a well tubing, and welding the upper body section to the main body section by a circumferential weld.

Another object is to provide a method of constructing a side pocket mandrel of the character just mentioned wherein the main body section has its lower portion formed separately by forming a lower body section with a main passage therethrough and means on its lower end for attachment to a well tubing, and said lower body section is welded to the lower end of said main body section by a circumferential weld.

A further object is to provide a method of constructing an improved side pocket mandrel of the character described wherein an orienting sleeve is formed with an orienting slot with a stop shoulder at the upper end thereof and with a guide surface below the slot and directed upwardly toward the slot, and said orienting sleeve is inserted in the upper portion of said upper body section above said belly and welded therein about its upper edge or brazed, such welding being done through the open upper end of said upper body section, such brazing being done in a furnace.

Another object is to provide a method of constructing an improved side pocket mandrel of the character described by forming an orienting sleeve with an orienting slot therein and with a guide surface below the slot and directed upwardly toward the slot, and inserting the orienting sleeve into the lower body section and welding it in position therein surrounding the main passage, such welding being done with access through an open end, preferably the open end of said lower body section and before the lower body section is welded to the main body section.

A further object is to provide a method of constructing an improved side pocket mandrel of the character described, which method includes forming deflector means and welding said deflector means to the inner wall of said upper body section in proper location to be positioned above the receptacle bore to deflect regular well tools away from the receptacle and toward the main passage as they move downwardly therepast, such non-structural welding being done through the open lower end of the upper body section before it is welded to the main body section.

Another object is to provide side pocket mandrels of the character described hereinabove having check valve means for preventing back flow through its lateral port means even when the offset receptacle bore has no flow control device disposed therein, said lateral port means providing communication between the exterior of the side pocket mandrel and the receptacle bore intermediate its ends.

Another object is to provide cartridge-type check valve means for side pocket mandrels which are economical to manufacture and easy to install and remove.

Another object is to provide an improved side pocket mandrel such as that just described wherein the check valve means is readily converted from "outflow" checking to "inflow" checking mode, and vice versa.

Another object is to provide a method of joining a pair of tubular members such as side pocket mandrel body sections in end-to-end relationship by a circumferential weld which provides full penetration, superior strength, and which does not obstruct or restrict the bore of such pair of tubular members as a result of such welding.

Other objects and advantages will become apparent from reading the description which follows and studying the accompanying drawings wherein:

BRIEF DESCRIPTION OF THE DRAWING

FIGS. 1-A and 1-B, taken together, form a longitudinal sectional view of one of the preferred embodiments of this invention;

FIG. 2 is a cross-sectional view taken along line 2—2 of FIG. 1-B;

FIG. 3 is a cross-sectional view taken along line 3—3 of FIG. 1-B;

FIG. 4 is a side elevational view of the orienting sleeve used in the side pocket mandrel of FIGS. 1-A and 1-B;

FIG. 5 is a cross-sectional view taken along line 5—5 of FIG. 1-B;

FIG. 6 is a fragmentary longitudinal sectional view showing an alignment ring in place between faying surfaces formed on the ends of adjacent body sections which are ready to be welded together;

FIG. 7 is a fragmentary view similar to FIG. 6 showing the body sections of FIG. 6 after having been welded together, the weld having been ground flush on its exterior surface, and showing that the aligning ring was melted during the welding process;

FIG. 8 is a fragmentary view similar to FIG. 6 showing faying surfaces formed on the ends of adjacent body sections mated and ready to be welded together;

FIGS. 9-A and 9-B, taken together, form a longitudinal sectional view of another preferred embodiment of this invention;

FIGS. 10-A and 10-B, taken together, form a longitudinal sectional view of another preferred embodiment of this invention;

FIG. 11 is a cross-sectional view taken along line 11—11 of FIG. 10-B;

FIGS. 12-A and 12-B, taken together, form a longitudinal sectional view of yet another preferred embodiment of this invention;

FIG. 13 is a side elevational view of the orienting sleeve used in the side pocket mandrel of FIGS. 12-A and 12-B;

FIG. 14 is a cross-sectional view taken along line 14—14 of FIG. 12-B;

FIG. 15 is a cross-sectional view taken along line 15—15 of FIG. 12-B;

FIG. 22 is a schematical view showing an injection well installation utilizing gas lift mandrels of this invention equipped with check valves;

FIGS. 23-A and 23-B together constitute an elevational view partly in longitudinal section showing a side pocket mandrel similar to the side pocket mandrel of FIGS. 9-A and 9-B but equipped with check valves;

FIG. 24 is a cross-sectional view taken along line 24—24 of FIG. 23-B;

FIG. 25 is a magnified view of a portion of FIG. 24 showing an alternate form of check valve assembly shown in position to block inflow into the receptacle bore from exterior of the side pocket mandrel;

FIG. 27 is a fragmentary longitudinal view similar to FIG. 8 showing an alternate shape for the external weld recess;

FIG. 28 is a fragmentary longitudinal sectional view similar to FIG. 7 showing approximately the way the joint of FIG. 8 or of FIG. 27 would appear after the tubular body sections are welded together and the weld subsequently ground flush;

DESCRIPTION OF THE PREFERRED EMBODIMENTS

Figures 16, 17, 18, 19, 20, 21, 26:
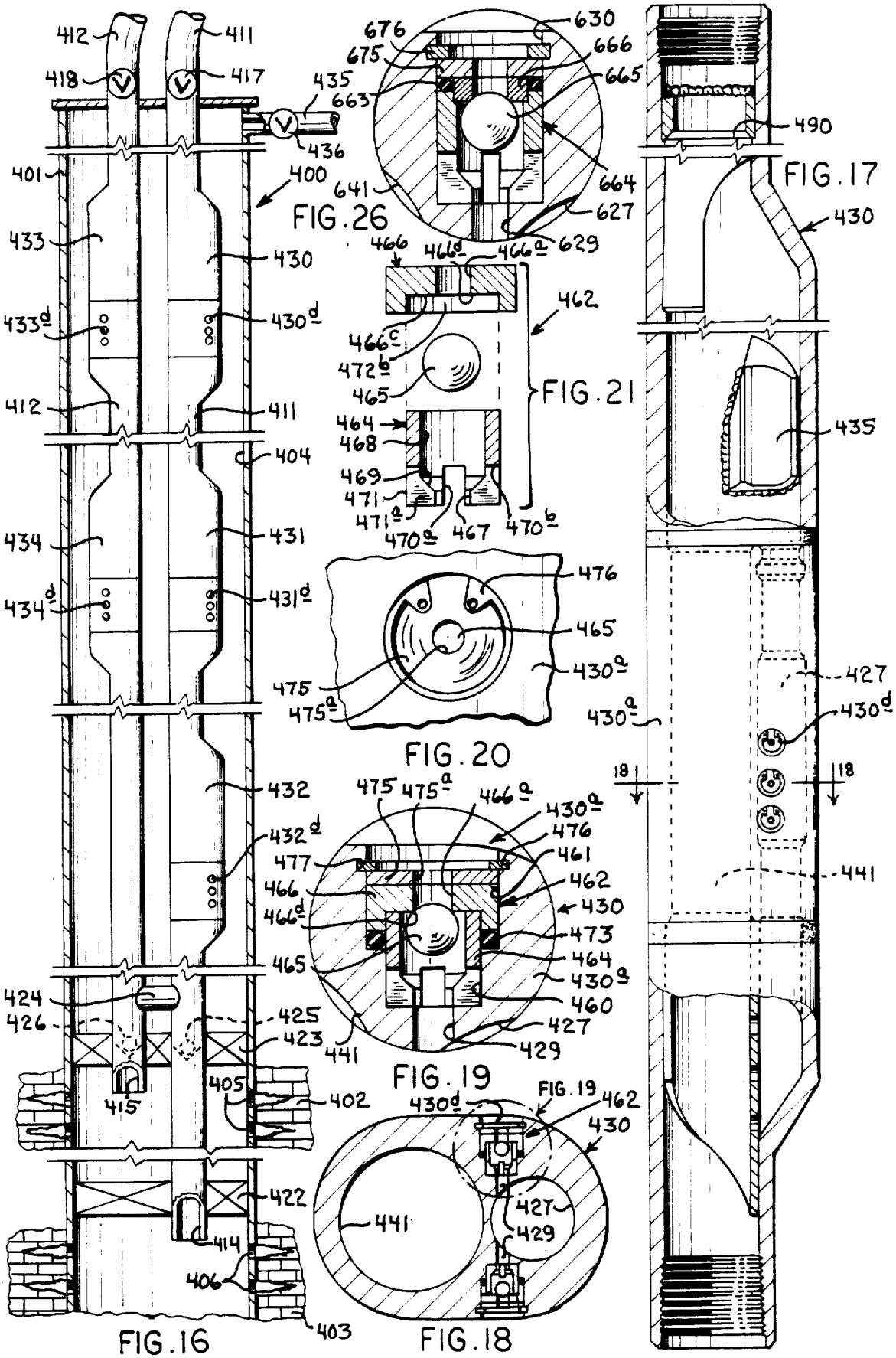
FIG. 16 is a schematical view showing a dual gas lift well installation utilizing side pocket mandrels of this invention with check valves.
FIG. 17 is an elevational view partly in longitudinal section showing a side pocket mandrel similar to the side pocket mandrel of FIGS. 12-A and 12-B but equipped with check valves.
FIG. 18 is a cross-sectional view taken along line 18—18 of FIG. 17.
FIG. 19 is magnified view of a portion of FIG. 18 showing one of the check valves controlling one of the lateral ports of the side pocket mandrel.
FIG. 20 is a fragmentary side view showing a check valve in one of the lateral ports of the side pocket mandrel of FIG. 17.
FIG. 21 is an exploded view of the check valve assembly of FIG. 19.
FIG. 26 is a view similar to FIG. 25 showing the check valve assembly and backup disk inverted so that outflow from the receptacle bore of the side pocket mandrel is blocked.

Referring now to FIGS. 1-A through 5, it will be seen that the side pocket mandrel of this invention is indicated generally by the numeral 20.

The mandrel 20 comprises a machined main body section 20a and an upper body section 20b permanently joined together by a circumferential weld 21.

Threads 22 and 23 are provided on the upper and lower ends of mandrel 20 for attachment to a string of well tubing.

Mandrel 20 is shown to have features which are well known such as a full opening main passage 25 extending throughout its full length, through which well tools may pass, a side pocket or belly 26 offset from the main passage 25 providing space for operation of a kickover tool (not shown), a receptacle bore 27 extending alongside the main bore 25 and opening upwardly into the belly 26 for receiving a flow control device (not shown), the receptacle bore 27 communicating at its lower end with the main bore 25 through cross passage 28 and, intermediate its ends, communicating with the exterior of the mandrel through lateral ports 29.

Mandrel 20, as shown, is further provided with well-known orienting means such as orienting sleeve 31 having the usual orienting slot 32, with a stop shoulder 33 at the upper end thereof, and guide surface 34 therebelow for orienting a conventional orienting type kickover tool (not shown) which is normally activated by means thereon engaging downwardly facing shoulder 33 provided at or near the upper end of slot 32. The passage through the orienting sleeve is full opening. Thus the guide surface 34 is outside the full open bore.

The mandrel is also provided with deflector means such as deflectors 35 and 36 which guide flow control devices (not shown), lowered into the mandrel through the well tubing (not shown) on a kickover tool (not shown), into the receptacle bore 27 but which will deflect other well tools, passing through the mandrel, into the main flow passage 25 in the well-known manner.

The receptacle, the orienting sleeve and the deflectors, generally speaking, are well known in the industry.

As shown, the mandrel 20 is substantially oval in cross section, having opposing flat sides 37 and 37a connecting spaced apart opposing semi-circular sides 38 and 39, as clearly shown in FIG. 2. The mandrel could, however, be of circular or other cross section, as desired, but the oval shape permits such mandrels to be used in dual wells where the mandrels may be disposed in side-by-side relationship or may be moved past one another in casing of reasonable size. Thus the flattened, or oval, shape permits use of smaller diameter casing or larger diameter tubing, other things being equal.

The main body section 20a of mandrel 20 is machined from an elongate solid one-piece main body blank preferably of the desired cross-sectional shape and preferably oval, as shown, but which could be circular or some other non-circular shape. The body blank could be a forging, a casting, or the like. The full opening main bore 41 is machined the full length of the blank, as shown, and the receptacle bore 27 is machined in the blank and extends downwardly alongside main bore 41. The lower portion of receptacle bore 27 may be reduced as at 27a, as shown, or it could be of the same diameter as that of its upper portion. Lateral ports 29 are drilled from the exterior surface of the blank into the receptacle bore as shown in FIGS. 1-B and 2 to interconnect the receptacle bore 27 with the region exterior of the blank. If both the upper and lower portions of receptacle bore 27 are of equal diameter, the bore should be enlarged slightly in the region of lateral ports 29 to provide relief therefor to provide proper flow passage from said ports 29 to the ports of a flow control device (not shown) which may be disposed in the receptacle bore to control flow through the ports 29 and cross passage 28. Providing the stepped receptacle bore as shown is generally to be desired because it is easier and less costly to machine.

An internal annular recess 44 is formed in receptacle bore 27 near its upper end providing a downwardly facing shoulder 45 which is engageable by a lock means on a flow control device (not shown) for anchoring such device securely in the receptacle.

A milling tool (not shown) of a diameter slightly smaller than the diameter of the main bore 41 is moved into the lower end of bore 41 to a location opposite the lower portion of the receptacle bore 27 and is moved laterally toward the receptacle bore to form the cross passage 28, thus, providing fluid communication between the receptacle bore 27 and main bore 41, as shown. It can readily be seen that main bore 41 can communicate with the region exterior of the main body through cross passage 28, receptacle bore 27 and lateral ports 29.

Thread 23 is machined in the lower end of main bore 25 for connection to a string of well tubing (not shown).

The lower end of the main body blank is preferably reduced in external dimension as at 47 concentric with thread 23 to facilitate use of handling tools, wrenches, or tongs which may be used in connecting the mandrel to the tubing. At the same time that the blank is reduced in size as at 47, a guide surface 48 preferably is also formed as shown to guide the mandrel past obstructions in the well on its downward trip thereinto.

The upper end of the main body section 20a is prepared for welding to the upper body section 20b by providing suitable faying surfaces thereon as shown in FIG. 6. The upper end of the body section 20a is carefully faced as at 51, generally chamfered exteriorly as at 52, and shallowly bored providing an internal annular recess 53 having a lower side surface 54 which is inclined inwardly and downwardly.

The term "full opening" as used herein to describe the main passage through a side pocket mandrel denotes that such main passage is approximately as large as the flow passage through the tubing for which the mandrel is fitted and will pass all ordinary well tools normally run through that size tubing. For instance, in 2⅜" nominal tubing the internal diameter is 1.995 inches and the drift diameter is 1.901 inches, while the full opening dimension used in the industry is 1.875 inches or larger since a bore of 1.875 inches or larger in landing nipples, and the like, will pass all ordinary tools designed for use in such well tubing. The main bores and main passages of the side pocket mandrels described herein, such as main bore 41 machined in main body section 20a, are described as full opening and have an inside diameter greater than the established minimum diameter for "full opening" and in fact are larger than drift diameter and will pass tools as large as drift diameter. Such bore may also be termed non-restricting.

Here it should be noted that U.S. Pat. No. 4,135,576 shows what appears to be a one-piece machined main body welded by circumferential welds to an upper body section. It is made very plain in the specification and clear in the drawing that the main bore in the main body is so restricted (that is, so much smaller than drift diameter of the tubing bore) that additional bypass passages are provided to permit larger flow rates otherwise made possible by the multiple flow control devices disposed in the multiple receptacle bores.

Further, it should be noted that U.S. Pat. No. 3,040,814 shows a machined main body section which is obviously made in two halves which are subsequently welded together by longitudinal structural welds although this is not discussed in the specification.

In U.S. Pat. No. 3,412,806, what appears to be a circumferential weld is shown in FIG. 35 which is a cross-sectional view taken along line 35—35 of FIG. 12. It will be noted that, in FIG. 12, the weld is not purely circumferential but contains portions which are longitudinal, appearing to comprise four longitudinal portions connected together by four arcshaped portions.

If the one-piece main body blank, from which the main body section 20a is formed, is produced by casting, forging, or similar process, it need not be solid since one or both of the main and receptacle bores may be provided therein by such process. If so, such bores may need only minimal machining. The receptacle bore will surely require finish machining, and the main bore may need finish machining also. If the casting or forging is carefully done, the main bore may be acceptable as cast or forged without such finish machining, thus effecting a saving in the cost of machining. This saving in the cost of machining may possibly be more than offset by the higher cost of more accurate castings or forgings.

The upper body section 20b is constructed from a length of tubular material preferably of the same cross-sectional shape as the main body section 20a. The mandrels illustrated in this application are shown to be constructed of material whose cross section is oval with a pair of opposing flat sides such as flat sides 37 and 37a (see FIGS. 2 and 5), but it should be understood that other shapes are also practical, especially round.

In forming the upper body section 20b, a length of oval tubing having the shape shown in FIG. 5 is heated at its upper end for a distance of several inches and is reduced in size as by forging or other suitable process to provide an end portion 61 which is eccentric and cylindrical and has a main passage 62 therethrough which is coextensive with and forms a part of main passage 25 which passes through the full length of the mandrel.

The reduced upper end portion 61 of the upper body section 20b is turned down to suitable outside diameter, preferably equal to the size of a tubing coupling, the bore 62 is cleaned up to predetermined inside diameter, and thread 22 formed in the upper end thereof.

The lower end of the upper body section 20b is prepared for welding in the same manner that the upper end of the main body section 20a was prepared. Its lower end is carefully faced as at 71 (seen in FIG. 6), generously chamfered exteriorly as at 72, and shallowly bored, providing internal annular recess 73 having an upper side surface 74 which is inclined upwardly and inwardly.

Before welding the two body section together, the deflectors 35 and 36 are welded in place as shown. The deflector 35 is inserted in the lower end of the upper body section 20b and located a predetermined distance from the lower end thereof and in proper alignment with the receptacle bore and then welded in such position by applying a non-structural weld bead 74 along two edges as shown or preferably along three edges. This weld has little penetration and its volume is small. Therefore, it will result in negligible distortion.

It will be noticed that deflector 35 has an outwardly facing vertical side wall comprising both flat and curved surfaces, 76 and 77, respectively, which conform to the inner wall of the mandrel in the location where it is to be welded and, thus, not only fits well but is easy to align with the receptacle bore for welding. The deflector's inner wall is concave at 78 and has a vertical rib at 79 to provide a guideway for guiding well flow control devices into the receptacle bore 41. The deflector is beveled downwardly and inwardly as at 80, relative to the receptacle bore, to further aid in guiding devices into the receptacle. In addition, the deflector 35 is beveled downwardly and inwardly as at 81, relative to the main passage 25, to deflect regular well tools away from the receptacle bore 27 and toward main bore 41, such regular well tools being generally too large in diameter to pass between the deflectors 35 and 36.

The other deflector 36, seen in FIG. 5, is a mirror image of deflector 35 and is installed in the same manner and functions in exactly the same way as does deflector 35, the pair of them cooperating to perform their functions as outlined hereinabove.

Orienting means is provided in the mandrel in the form of an orienting sleeve 31, better seen in FIG. 4. The orienting sleeve 31 is cylindrical and is provided with an orienting slot 32 providing a downwardly facing shoulder 33 at its upper end. The shoulder 33 may entirely block the top of slot 32, or block it only partially, as shown. The orienting sleeve has a guide surface 34 below the slot 32 which is directed upwardly toward the bottom of the slot, as shown.

The orienting sleeve 31 may be welded in place either before or after the upper and main body sections are welded together. The orienting sleeve 31 is inserted in the upper end of the upper body section and positioned therein above the belly 26 with its orienting slot 32 facing in the opposite direction from the receptacle bore and with its downwardly facing shoulder 33 a predetermined distance above the deflectors and/or receptacle bore.

It is well known in the industry that the location and orientation of orienting sleeves are dictated primarily by the particular kickover tools used in the particular side pocket mandrels and in accordance with the type of selectivity employed in the system. The orienting sleeve 31 in mandrel 20 can be oriented as desired and placed at the desired distance above the deflectors and/or receptacle bore as desired, according to the kickover tool to be used with the mandrel.

In joining the upper and main body sections together, their faying surfaces are brought together and an alignment ring or weld ring 84 is positioned so that the upper and lower sides of its external flange 85 are in contact with the end faces 51 and 71 of the adjacent body sections 20a and 20b. The inner side 84a of the alignment ring 84 is preferably semicircular as shown. This ring is generally formed from a wire of the desired cross section. This wire is then wound or bent to conform to the shape of the end faces of the mandrel body sections, that is, circular, oval, or the like, shape. A slight gap (not shown) is left between the ends of the alignment ring, enabling the ring to be compressed slightly for easy insertion into the shallow bore at the end of one of the body sections. Alignment rings are well known to steel fabricators.

With the body sections assembled as shown in FIG. 6, and with the main passage 25 through them aligned axially, the two body sections, together with the aligning ring therebetween, are tack welded at spaced intervals about their periphery to hold them fast for further welding. Welding is then performed in the well-known manner beginning at the aligning ring and continuing around the mandrel in successive passes until the external recess formed between the upper and lower chamfers 72 and 52 of the body sections is more than filled by the weld metal. In this welding process, the aligning ring 84 is preferably melted, thus providing complete penetration of the weld and providing a joint with maximum strength. The inner portion of the aligning ring 84, although having been melted in the welding process, should retain its shape to some extent and form an internal ridge or bead approximately as shown in FIG. 7, which bead should remain entirely within the recess defined by the annular inclined surfaces 54 and 74 so that it will not protrude into the main passage 25 where it might interfere with the passage or operation of well tools, and the like.

It will be noticed that the weld 21 is purely circumferential, encompassing the mandrel in a plane normal to its longitudinal axis, and that it is located at the end of the one-piece main body section 20a so that this main body section lends very significant support to the mandrel, enabling it to withstand greater differential pressures both from within and without. The web 90 left between and separating the main bore 41 and the receptacle bore 27 is extremely effective in strengthening the mandrel, especially so in the direction in which such strength is most needed, that is, in a direction normal to the major axis of the oval tubing and normal to a plane passing through the centers of the main and receptacle bores. Of course, this web adds much strength to the mandrel as just mentioned above whether the mandrel is oval, round, or otherwise, since whatever the shape, there would exist a web between the main and receptacle bores.

It is readily understood that, since distortion is caused by shrinkage of the weld metal upon cooling, the circumferential weld at the juncture of the two body sections will have little distortion effect since the stresses induced by such weld are evenly distributed about the mandrel and tend to balance out. These stresses can be relieved by a post-heat or normalizing operation, and there should be little or no need for subsequent straightening of the mandrel.

It is understood that other types of faying surfaces could be formed on the ends of adjacent body sections preparatory to circumferentially butt welding them together. The form illustrated in FIGS. 6 and 7 may be preferred by some fabricators while others may prefer another form such as that illustrated in FIG. 8. For high quality mandrels which will be subjected to considerable pressures and loads, it is highly desirable to obtain full penetration of the weld.

While many forms of faying surfaces may be found suitable, the form illustrated in FIG. 8 should be very desirable because it is very similar to the form shown in FIG. 6 and completely eliminates the aligning ring, and its attendant difficulty in assembling, while permitting full penetration welding. However, satisfactory welds may be accomplished using faying surfaces such as those seen in FIGS. 27, 29, 30, and 31.

Referring to FIG. 8 it will be seen that upper body section 20b' is prepared for welding very much as shown for upper body section 20b in FIG. 6. Its lower end is faced at 71a, externally chamfered at 72a, and shallowly bored providing internal annular recess 73a having a side surface 74a which converges upwardly and inwardly. The upper end of main body section 20a' is prepared to appear much like main body section 20a shown in FIG. 6 but with the aligning ring, as it were, made integral with the body. The upper end of the main body 20a' is reduced in outside dimensions as at 95 so that this reduced portion is received in the shallow bore or recess 73a of the upper body section and also providing an upwardly facing shoulder 96 which abuts the lower end face 71a of the upper body section, as shown in FIG. 8. The reduced portion 95 on the upper end of the main body section 20a' fits rather closely in the bore 73a of the upper body section 20b' and maintains the thus engaged ends of these two body sections against lateral displacement to facilitate the tack welding operation. The upper end of the main body section is also generously chamfered at 97, as shown. The inner edge of the upper end of the main body section 20a' is rounded as at 98 to resemble the shape of the inner portion of the aligning ring 84 seen in FIG. 6. It is desirable, but not necessary, to provide an internal annular recess 99 in the main body section adjacent the rounded corner 98 to provide an internal ridge 100 to more perfectly provide a shape resembling that of an aligning ring formed integrally with the main body section. If the recess 99 is not provided, the main body section should be at least bored for a short distance to provide a recess similar to recess 53, 54 of FIG. 6 to contain the innermost portion of the weld so that this weld will not obstruct the main passage 25 through the mandrel 20.

During the welding process, the ridge 98 is melted to become a part of the weld as shown in FIG. 28 and provide full penetration in the same manner that the aligning ring 84 was melted to become a part of the weld as explained in connection with FIGS. 6 and 7.

The weld is completed as before by tack welding at spaced intervals about the mandrel and then making successive welding passes around the mandrel until the recess defined by the chamfers 72a and 97 on the upper and main body sections is more than filled with weld metal. The excess weld metal is then ground off to provide a surface which is flush with the exterior of the mandrel body as is clearly shown in FIG. 28.

A similar welded joint can be produced by preparing the ends of the tubular members to be connected approximately as shown in FIG. 27. This joint resembles the joints shown both in FIG. 6 and FIG. 8. Its internal recess 73a' and 99' plus the rounded internal bead or ridge 98' are substantially like those shown in FIG. 8 while the external chamfers 72' and 52' are substantially like chamfers 72 and 52 of FIG. 6 and form an external circumferential V-groove. This welded joint is completed as outlined hereinabove by assembling, tack welding, depositing continuous welds during which full penetration is accomplished, over-filling the external V-groove with successive weld passes, and then, if desired, grinding the weld flush with the exterior of the tubular members. The completed welded joint would appear approximately like that shown in FIG. 7 or in FIG. 28.

Figure 29:
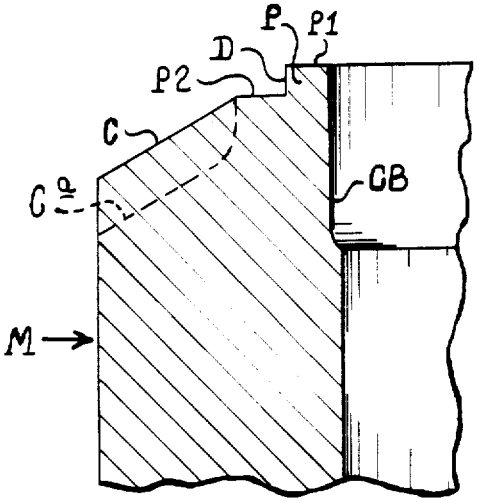
FIG. 29 is a fragmentary longitudinal sectional view showing a portion of a tubular member having faying surfaces formed thereon preparatory to welding to a mating tubular member.
Figure 30:
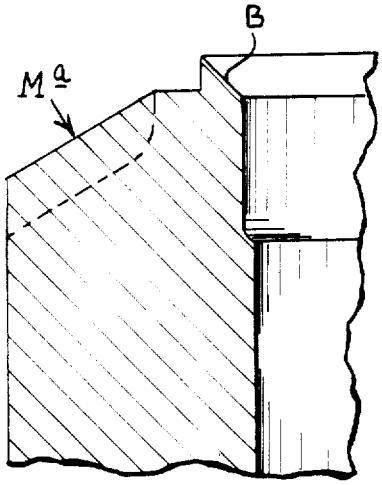
FIG. 30 is a fragmentary view similar to FIG. 29 showing a portion of a tubular member having modified faying surfaces formed thereon.
Figure 31:
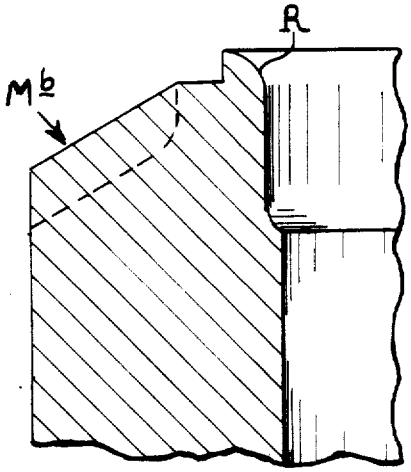
FIG. 31 is a fragmentary view similar to FIG. 29 showing a portion of a tubular member having further modified faying surfaces formed thereon.

Alternatively, good full-penetration welds can be accomplished with the end of one of the tubular members, such as member 20a of FIGS. 6 and 7 or member 20a' of FIG. 8, prepared even as shown in FIG. 29, 30, or 31.

In FIG. 29 such tubular member is indicated by the letter M. It has been prepared by counterboring as at CB and further prepared by facing the end of the member to provide a first planar surface P1 and reducing the outside dimension as at D to provide a projection which would fit closely but telescope readily into the counterbore of the mating tubular member such as counterbore 73a of tubular body member 20b' of FIG. 8. The short projection P is surrounded by a second planar surface P2. The member M has been chamfered generously at C, but preferably would be chamfered as shown in dotted lines as at Ca.

In similar manner the tubular member Ma seen in FIG. 30 has been prepared in the same manner as was the tubular member M of FIG. 29, but additionally has been beveled at B as shown, this bevel B substantially removing the remaining portion of the first planar surface P1 (seen in FIG. 29).

The tubular member Mb has been prepared in a manner similar to that of member Ma of FIG. 30, but instead of being provided with the bevel B, the inner corner of the projection P (seen in FIG. 29) has been rounded as at R, this rounded surface substantially removing the remaining portion of the first planar surface P1 (seen in FIG. 29). The member Mb of FIG. 31 has been prepared much like member 20a' of FIG. 8, but is has not been provided with the recess 99.

Either of the members Ma or Mb can be chamfered as was member M at C (FIG. 29), but is preferably chamfered as at Ca (FIG. 29).

When member M, Ma, or Mb is mated with a tubular member such as body member 20b of FIGS. 6–7 or member 20b' of FIG. 8, and welded as described hereinabove, the full-penetration weld would be similar to that shown in section in FIG. 28.

In either case, whether the faying surfaces are formed as shown in FIG. 6 (which requires an alignment ring), or as shown in FIG. 8, 27, 29, 30, or 31, which needs no alignment ring, full-penetration homogeneous welds can be more readily achieved under oxygen-free conditions. Tests have shown that the pair of tubular members should be filled with an inert gas at least during the root welding pass or passes. This inert gas displaces the oxygen-laden air from the bores of these assembled members and prevents formation of scale on the inner surface of the weld, thus permitting the molten weld metal to form a scale-free, homogeneous weld which forms a well-shaped relatively flat bead, somewhat as shown in FIG. 7 or 28, which does not protrude into the normal bore of the tubular members.

While several inert gases may be suitable for use as a backing gas in such welding operations as just described, Argon gas has been found to be excellent.

Welded joints such as those typified by the welded joints shown in FIGS. 6–8 and 27–31 have been constructed, tested, sectioned and inspected and found to have full penetration, excellent physical characteristics, and to be substantially distortion free and homogeneous.

Either of the welds illustrated and described herein are suitable not only in joining body sections of side pocket mandrels but are also suitable for welding other tubular members together.

It will further be seen that the deflectors and the orienting sleeve are welded internally of the mandrel with light low-penetration low-volume welds which have negligible distortional effect on the mandrel. (The deflectors could be secured in place by brazing, if desired.)

It will further be seen that plug welds and longitudinally extending welds, which would tend to weaken the mandrel, are not used in the construction of the side pocket mandrel hereinabove described; that the only weld of consequence so far as the structural and physical strength, and competence of the mandrel are concerned is the circumferential weld joining adjacent body sections and that it is both strong and well supported; and that it is non-longitudinal, and of full penetration, and relatively non-distorting (due to the stresses induced thereby being balanced), as before explained.

Side pocket mandrel 20, having an orienting sleeve in its upper end, as well as such mandrel without an orienting sleeve, would find greatest utility in well installations where flow control devices used in their receptacle bores are installed and removed through use of kickover tools run into the wells and withdrawn therefrom on a conventional wireline. Side pocket mandrels having orienting means below the upper end of the receptacle bore are generally for use in underwater well installations where kickover tools are run into and out of the wells through use of pumpdown or through flow line (TFL) techniques. In pumpdown operations, tool strings are moved through tubing strings and flow lines by pumping fluid whose pressure is applied to piston elements forming a part of each tool string. One such mandrel for use in pumpdown wells is illustrated in FIGS. 9-A and 9-B.

Referring now to FIGS. 9-A and 9-B, a second embodiment of this invention will be seen to be indicated by the numeral 120. The side pocket mandrel 120 is similar to mandrel 20 in that it comprises a machined main body section 120a and an upper body secton 120b joined together by a circumferential weld.

The main body section 120a is machined from an elongate one-piece body blank of desired cross-sectional shape as was the main body section 20a of FIG. 1-B. A full opening main bore 141 is machined longitudinally through the blank, and receptacle bore 127 having a reduced lower portion 127a is machined alongside main bore 141, as shown. Lateral ports 129 communicate the exterior of the mandrel with the receptacle bore 127 at a point immediately above reduced bore portion 127a, and cross passage 128 interconnects the lower end of the receptacle bore with the main bore 141.

Recess 141 formed near the upper end of receptacle bore 127 provides a downwardly facing shoulder 145 engageable by lock means on a flow control device (not shown) to secure such device in the receptacle bore where it will control flow through lateral ports 129.

The upper body section 120b is formed much like the upper body section 20b of the side pocket mandrel 20, previously described. It is formed of tubular material, reduced at its upper end as at 161 and threaded as at 122. It is provided near its upper end with stop shoulder means which will be later described. The mandrel 120 has a full opening main passage 125 extending therethrough threaded at both ends as at 122 and 123 for connection to a string of well tubing, the main passage being continuous with the bore of the tubing when the mandrel is connected therein and is a part thereof.

Deflectors 135 are welded to the inner wall surface of the upper body section 120b in the proper position, as shown, to function exactly as in the preceding embodiment 20.

The upper body section 120b is welded to the lower body section 120a in exactly the same manner that the upper and lower body sections 20b and 20a were welded together to provide mandrel 20, as before explained.

Main body section 120a has a reduced portion 147 at its lower end which is substantially the size of a tubing coupling and is provided with an internal thread 123 for attachment to a tubing string. Thread 123 is formed in the lower end of main bore 141.

Orienting means is provided in the main body section. Although such orienting means could be provided by an orienting sleeve welded or brazed in place in main bore 141 somewhere below the upper end of the receptacle bore, the lower body section as shown has orienting means formed integrally with the body 120a as shown. To provide the orienting means shown in FIG. 9-B, the lower end of main bore 141 is enlarged as at 141a to provide a downwardly facing guide surface 134 shaped like the guide surface 34 of the orienting sleeve 31 previously described. This guide surface 134 is below orienting slot 132 and is directed upwardly toward the lower end of the slot. The guide surface is outside the full open bore. The upper end of the slot 132 runs out into the main bore 141 and does not provide a downwardly facing shoulder since such shoulder is not required in order to operate pumpdown kickover tools used in this mandrel. However, such a shoulder could be provided if desired. Instead, a downwardly facing shoulder 190 for activating a pumpdown kickover tool is provided by ring 191 disposed in the upper end of the mandrel 120 where it rests upon upwardly facing shoulder 192 formed in the upper body section 120b and is welded in place by a weld 193, as shown, such weld being applied through the open end of the upper body section. The passage through the ring 191 is full opening and the shoulder 190 thereon is outside the full opening bore.

It should be noted here that U.S. Pat. Nos. 4,106,563 and 4,106,564 disclose orienting means forged integrally with an upper sub which forms the uppermost portion of the mandrel, being welded to the mandrel by a circumferential weld. The orienting means of mandrel 120 herein described is formed integral with the main body section, is located at the lower end of mandrel 120 and has no stop shoulder at the upper end of the orienting slot.

Side pocket mandrel 120 performs the same functions as does mandrel 20 but is constructed slightly differently since it is for use in underwater wells and requires use of a pumpdown kickover tool. This type of mandrel is very useful in pumpdown operations in underwater wells.

Rather than forming the orienting guide surface 134 and slot 132 integrally with the main body section as shown, an orienting sleeve could be welded or brazed in place therein to orient a kickover tool. To accomplish this, the main bore 141 is enlarged at its lower end as at 141a for a sufficient distance to accommodate an orienting sleeve similar to the orienting sleeve 31 of FIG. 4. It is preferable in this case to bevel the upper end of the counterbore 141a, and the upper outer corner of the orienting sleeve would likewise be suitably chamfered so that a cam surface rather than a stop shoulder would be present at the upper end of the orienting slot. This orienting sleeve preferably would have holes of suitable size formed in its wall for non-structural plug welding of the sleeve in place in counterbore 141a. Such welding, carefully done, would not interfere with the passage of well tools through the orienting sleeve and would leave the guide surface unmarred by welding.

The side pocket mandrel illustrated in FIGS. 10-A, 10-B, and 11 represents another embodiment of this invention. This mandrel is indicated generally by the numeral 220 and comprises a main body section 220a, upper body section 220b, and lower body section 220c which are circumferentially welded together as shown.

The side pocket mandrel 220 has a full opening main passage 225 extending therethrough threaded at its opposite ends as at 222 and 223 for attachment to a string of well tubing, the main passage 225 being continuous with the bore of the well tubing when the mandrel is connected thereto and is a part thereof.

The main body section 220a is machined from an elongate one-piece blank in much the same manner that the main body sections 20a and 120a were machined. A full opening main bore 241 is machined longitudinally through the blank and a receptacle bore 227 is machined alongside the main bore, as shown. This bore could, if desired, extend only part of the way through the blank, in which case the bore would likely be smaller in diameter in its lower portion (below the lateral ports, in which case a cross passage such as cross passage 28 of mandrel 20 would be required), or it could extend through the blank from end to end. It is preferable to have the receptacle bore pass completely through the blank, as shown in FIG. 10-B. Receptacle bore 227, as shown, is not reduced in size in its lower portion as was the receptacle bores 27 and 127 of mandrels 20 and 120. Receptacle bore 227 is enlarged as at 227a from a point above lateral port 229 to a point therebelow to provide adequate flow area in that region to permit unhampered flow between lateral ports 229 and a flow control device (not shown) which may be disposed in the receptacle bore. An internal annular recess 244 is machined in bore 227, near its upper end as shown, to provide a downwardly facing lock shoulder 245 which is engageable by lock means on a flow control device (not shown) to secure such device in position to control flow through lateral ports 229 which communicate the receptacle bore with the exterior of the mandrel. The receptacle bore 227 and the main bore 241 through the blank communicate by way of their open lower ends which are in direct communication with the space inside the lower body section 220c immediately therebelow. The main body section has both of its ends prepared, as desired, for later welding to the other body sections.

The upper body section 220b is formed in the same manner as was the upper body section 20b of the first embodiment and would be interchangeable therewith except for the fact that they are welded to their respective main body sections. Their structure, functions, and characteristics are identical.

The upper body section is reduced at its upper end as at 261 above the belly 226 to the same diameter as a tubing coupling, and this reduced portion has a bore 262 in which a conventional orienting sleeve 231 is welded about its upper end, as before. Deflectors 235 are welded to the inner wall of the upper body section before this section is welded to the main body section 220a as before explained.

The lower body section 220c of side pocket mandrel 220 is formed in the same manner in which the upper body section 220b is formed. It is formed of the same tubular material used to form the upper body section. The lower end of the lower body section 220c is reduced as at 247, is finished to the same diameter as a tubing coupling, and bored and internally threaded as at 223 for attachment to a tubing string. This thread is concentric about the axis of the main bore 225 which extends throughout the full length of the mandrel.

The upper end of the lower body section 220c is prepared as desired for welding as before explained.

Mandrel 220 is assembled so that the faying surfaces on the upper and lower ends of main body section 220a are properly abutted with the faying surfaces on the ends of the upper and lower body sections 220b and 220c, respectively. Thus assembled and with the main passage 225 through the three body sections aligned axially, the adjacent body sections are circumferentially welded together in the aforesaid manner to complete the mandrel 220. If desired, one of the end body sections (upper and lower) can be assembled and welded to the main body section before the other section is assembled and welded thereto.

It was shown that the upper and lower body sections 220b and 220c were made of identical tubular material. For ease of manufacture and to avoid wastage, these upper and lower body sections can be formed from a single piece of tubular material by forging the upper reduced portion 261 on one end of the tubular piece and forging the lower reduced portion 247 on the other end of the same tubular piece and in axial alignment therewith. These reduced portions are then cleaned up by facing their ends, turning the reduced portions to proper size and boring them to desired internal diameter to make certain that a full-size main passage extends the full length of the tubular piece. This piece is then cut into two pieces, one of them being the upper body section and the other piece being the lower body section. In the same manner, two upper or two lower sections could be made and then cut apart. Making two such pieces together is especially expedient and economical where the die forging equipment cannot perform the required forging operations on short pieces because considerable length may be required for gripping purposes. The shorter lower body section may be too short to forge on some equipment, so tubular material can be saved by forging the sections in pairs and cutting them apart later.

The side pocket mandrel 220 of FIGS. 10-A and 10-B, when furnished with or without the orienting sleeve 31, finds greatest utility in wells where flow control devices are to be inserted in or removed from the receptacle bore 227 through use of suitable kickover tools lowered into the well and manipulated by conventional wireline techniques.

The side pocket mandrel illustrated in FIGS. 12-A and 12-B represents another preferred embodiment of this invention and is seen to be indicated generally by the numeral 320. It is very similar to the side pocket mandrel of FIGS. 10-A and 10-B, except that it has its orienting sleeve in its lower end and a tripping ring in its upper end and is, therefore, for use primarily in wells such as underwater wells where flow control devices are inserted in and removed from the side pocket mandrel through use of a pumpdown kickover tool pumped into the well as a part of a pumpdown tool string.

Side pocket mandrel 320 comprises a main body section 320a which may be identical to the main body section 220a of the mandrel 220, and an upper body section 320b which may be identical to the upper body section 120b of mandrel 120, and a lower body section 320c which is much like the lower body section 220c with the exception of the addition of an orienting sleeve.

The main body section 320a is machined from an elongate one-piece body blank as was main body section 220a described earlier. It has a full opening main bore 341 and a receptacle bore 327 extending alongside thereof. Main bore 341 forms a part of and is continuous with main passage 325 which extends throughout the full length of the mandrel. Receptacle bore 327 is enlarged at 327a in the region of the lateral ports 327 which communicate the receptacle bore 327 with the exterior of the mandrel. Near its upper end, receptacle bore 327 is enlarged as at 344 to provide a downwardly facing shoulder 345 engageable by lock means on a flow control device (not shown) to lock such device in the receptacle bore in position to control flow through the lateral ports 329.

Both the upper and lower ends of main body section 320a are prepared in the desired manner for circumferentially welding to the other body sections.

The upper body section 320b is the same as upper body section 120b of mandrel 120 and performs exactly the same functions. It is provided with shoulder means in its reduced upper end portion 361 for activating a pumpdown kickover tool. A cylindrical ring 391 having a full opening bore therethrough and a downwardly facing internal annular shoulder 390 thereon is disposed on top of upwardly facing shoulder 392 formed in the reduced portion 361. The ring is welded or brazed in place as shown by weld 393 which is applied through the open end of the upper body section. This ring may be installed either before or after the section is circumferentially welded to the main body section.

The lower body section 320c is similar to lower body section 220c of mandrel 220, but is modified by providing an orienting sleeve therein for orienting a pumpdown type kickover tool generally used in pumpdown or underwater wells.

The main bore of the lower body section is bored out a little deeper than was the main bore of lower body 220c and provides an inclined downwardly facing shoulder 320d which is engaged by the chamfered upper end 320e of orienting sleeve 331 disposed as shown in FIG. 12-B.

Orienting sleeve 331 is formed as shown in FIG. 13. It is cylindrical with an orienting slot 332 open at both ends. It has an orienting guide surface 334 below slot 332 and directed upwardly toward the slot in the usual manner. The sleeve is placed in the lower body section in position surrounding the main passage through the mandrel and is welded in place as at 333 as clearly seen in FIG. 14. A series of holes 335 is provided in the sleeve on the side opposite the orienting slot to facilitate flow between the main bore and the lower end of the receptacle bore.

The side pocket mandrel 320 is of circumferentially welded construction the same as the mandrels described hereinabove. It serves the same functions as does the mandrel 12, both of them finding principal utility in underwater wells in which operations are performed through use of well-known pumpdown techniques.

In some gas lift installations having side pocket mandrels serviced by means of pumpdown tools which must be moved through the well tubing by circulation of liquids such as water, salt water, or oil, problems arise when the circulation path becomes short circuited because of one or more vacant side pocket receptacles. This can, for instance, happen very readily in dual wells such as that illustrated in FIG. 16.

In FIG. 16, the well installation 400 is equipped with casing 401 penetrating upper and lower producing formations 402 and 403, respectively, which communicate with the casing bore 404 through perforations 405 and 406, respectively.

Long and short tubing strings 411 and 412, respectively, are disposed within the casing, the long string 411 terminating adjacent the lower zone 403 and its bore 414 communicating therewith through perforations 406 while the short string 412 has its lower end disposed adjacent the upper zone and its bore 415 communicating therewith through perforations 405.

The upper ends of the long and short tubing strings 411 and 412 are provided with valves 417 and 418, respectively, at their upper ends which are connected to flow lines 419 and 420, respectively.

A single well packer 422 is disposed between the upper and lower zones 402 and 403 and seals the annulus between the tubing 411 and the casing 401. A dual well packer is disposed a short distance above the upper zone 402 and seals the annulus between the two tubing strings (411 and 412) and the casing 401. The thus isolated upper and lower zones 402 and 403 communicate with the short and long tubing strings 412 and 411, respectively, and the flow streams from the two formations cannot commingle.

The long tubing string 411 and the short tubing string 412 are fluidly connected through the lateral tubular connecting member 424 so that liquids can be circulated down one tubing string, through the lateral connection 424, and up the other tubing string to the surface in U-tube fashion. Of course, during such circulation operation, standing valves 425 and 426 are disposed in the long and short tubing strings 411 and 412, respectively, at a level below the lateral connection 424 to prevent pumping of liquids into either of the formations 402 and 403.

The long tubing string 411 is provided with one or more side pocket mandrels such as upper, intermediate, and lower side pocket mandrels 430, 431, and 432, respectively, while the short tubing string 412 is similarly provided with upper and lower side pocket mandrels 433 and 434, respectively.

Using pumpdown tools and techniques, flow control devices in the side pocket mandrels 430–434 can be serviced in the usual manner. However, since the location of pumpdown tools is determined principally by volumetric measurements of the liquids pumped, and since a vacant receptacle in a side pocket mandrel in either of the tubing strings could allow some of the pumped liquid to pass outwardly from the well tubing through the lateral port(s) into the annulus, or permit lift gas from the annulus to enter through such port into the tubing, volumetric measurements of pumped liquids can be very inaccurate. Such inaccuracy can result in performing operations at the wrong location in the well such as in the wrong side pocket mandrel or the like, and this can be both costly and time consuming.

In gas lifting of such dual wells where at least one string of well tubing therein is equipped with side pocket mandrels of the type discussed above, check valves are needed to prevent back flow, that is, out flow through the lateral ports. Check valves will thus permit maintaining a fluid pressure in the circulating system at a value exceeding the pressure in the annulus and thus maintain the check valves closed and preclude any flow through the lateral ports.

The side pocket mandrels 430–434 are each provided with a plurality of laterals ports 430d, 431d, 432d, 433d, and 434d, respectively, and each of these ports contains check valve means to prevent back flow or outflow therethrough.

FIG. 17 shows a side pocket mandrel 430 which, except for the lateral port means, is shown to be exactly like side pocket mandrel 320 of FIGS. 12-A and 12-B, but could be similar to any of the side pocket mandrels shown in FIGS. 1–15.

The side pocket mandrel 430 of FIG. 17 is provided with a plurality of lateral port means 430d each of which includes check valve means more clearly shown in FIG. 18. It is readily seen that lift gas from exterior of the side pocket mandrel must pass through the lateral port means to enter the receptacle bore 427. It is preferable that the total flow capacity of the plurality of lateral flow port means, with check valves therein, equal or exceed the flow capacity through the gas lift valve or other flow control device disposed within the receptacle bore of the side pocket mandrel, this in keeping with good design practices.

The body 430a of mandrel 430 is provided with a plurality of lateral passages 429 which communicate the exterior of the mandrel with the receptacle bore 427.

Passage 429 is enlarged as at 460 and further enlarged at 461 as shown to receive the check valve assembly.

The check valve assembly 462 includes a check valve cage 464, a ball 465, and a check valve seat member 466 assembled as shown. Referring to FIG. 21, it will be seen that the check valve cage 464 has a flow passage 467 therein which is about equal in size to that of passage 429 in the mandrel body and which is enlarged at 468 providing an inclined shoulder 469. The cage is provided with crossed slots 470a and 470b and these slots extend upwardly in FIG. 21 for some distance above shoulder 469. Thus, the crossed slots provide a plurality of dependent fingers 471 having inwardly projecting bosses 471a. Enlarged bore 468 is only slightly larger than the diameter of ball but normally the ball is in engagement with the bosses 471a and the crossed slots provide ample flow passage past the ball.

The check valve seat member 466 has a passage 466a therethrough approximately equal in diameter to passage 429 in the mandrel and providing a seat at 466d engageable by ball 465. Passage 466a is enlarged as at 466b to provide an abrupt shoulder 466c. Enlarged bore 466b is sized to receive the upper end of the cage 464 which is telescoped thereinto as shown in FIG. 19.

The cage 464 may be bonded to the seat member 466 with the ball 465 inside, if desired. The check valve parts may be formed of any suitable materials. The ball is preferably formed of stainless steel. The cage and seat member may be made of steel, stainless.steel, brass, or the like metallic materials, but may preferably be formed of plastic material. Thermoset plastics such as Phillips' RYTON (Polyphenylene Sulfide) or DuPont's VESPEL "SP-1" Polyimide Resin, for instance, are very suitable materials from which to mold the cage and seat member, and especially the seat member. These materials are suitable for injection molding, have adequate strength, and the seat will conform to the ball to make a good seal. (There is a second form of Polyphenylene Sulfide which is a thermoplastic suitable for compression molding. This material may be suitable for making check valve seats such as seat 466 but would not be as suitable in production since injection molding has advantages over compression molding.)

The check valve assembly 462 (composed of cage 464, ball 465, and seat 466) is disposed in the lateral passage of the mandrel as shown in FIG. 19 after a suitable seal ring such as o-ring 473 has been placed about the cage. The check valve cage and seat are telescopingly assembled to one another and form a handy cartridge. If the cage and seat are formed of plastic material as mentioned above, bonding them together may be desirable.

The cage portion of the check valve assembly 462 is disposed in enlarged bore portion 460 while the seat member 466 is disposed in further enlarged bore portion 461, the o-ring 473 being confined between the shoulder formed by the abrupt transition from bore 460 to bore 461 and the end of the seat member, and it is also confined between the exterior surface of the cage and the wall of bore 461, thus to prevent flow of fluids around the cage.

A washer-like back-up member 475 having a passage 475a therethrough equal in size to lateral passage 429 is installed after the check valve assembly 462, as shown, and supports the seat member, which may be formed of a relatively yieldable, non-metallic material, against high internal pressures pressing the ball 465 against the seat with considerable force.

A retaining ring such as snap ring 476 is disposed in annular recess 477 to retain the check valve mechanism in place as shown in FIG. 19. When the ball 465 is "on seat" as shown, outflow cannot take place from receptacle bore 427 to the exterior of the mandrel since the ball closes passage 466a of the seat. Flow from exterior of the mandrel to the receptacle bore 427 may take place readily since such inflow will move the ball 465 to an "off seat" position permitting flow to take place through the seat passage 466a. Even if the ball is in engagement with the internal bosses 471a of cage fingers 471, fluids may flow freely around the ball, pass through slots 470a and 470b and flow back into lateral passage 429 and thereafter enter the receptacle bore.

Provision of check valves in side pocket mandrels as just described makes it possible in a system such as that illustrated in FIG. 16 to maintain fluid pressures in the tubing strings in excess of the pressures in the annulus exterior thereof to maintain the check valves in all of the mandrels closed and thus prevent transfer of fluids between the tubing and casing. In this way, accurate volumetric measurements can be made of the liquids pumped, thus permitting more accurate determinations of the location of the pumpdown tool string at any given time.

It is possible to provide check valves similar to the check valve assembly 462 just described but which checks flow in the opposite direction. Such a check valve prevents flow from exterior of the side pocket mandrel into it receptacle bore.

FIG. 22 illustrates a system wherein such side pocket mandrels find utility. In FIG. 22 a well casing 500 is shown to penetrate three underground formations which are indicated by numerals 501, 502, and 503, representing the upper, intermediate, and lower formations respectively. These formations communicate with the bore 504 of the casing through perforations 505, 506, and 507, respectively. A tubing string 508 is disposed in the casing 500 with its lower end adjacent lower formation. 503. A first well packer 509 seals between the tubing and casing and separates the lower formation from the intermediate formation. A second well packer 509a seals the annulus between the tubing and casing and separates the intermediate from the upper formation.

The tubing string 508 includes a first side pocket mandrel 510 disposed opposite the upper formation and a second such mandrel 511 disposed opposite the intermediate formation while a suitable landing nipple 512 is disposed adjacent the lower formation.

Well tools (not shown) such as injection regulators or the like are disposed in the receptacle bores of both mandrels 510 and 511 and also in the landing nipple 512.

Fluids injected into the well from the surface move downwardly through the tubing and are injected into the separate formations 501, 502, and/or 503 under control of the injection regulators or the like (not shown). Such fluids may be injected into the formations for the purpose of maintaining their pressures as in water drive or recycling projects or they may be injected merely to dispose of such liquids. In either case the formation pressures may be considerable.

When one of the injection regulators (not shown) is removed from one of the side pocket mandrels 510 or 511, fluids from the corresponding formation may tend to flow into the tubing and perhaps from there into one of the other formations. The reverse check valves in the lateral ports of the mandrels, however, will prevent such occurence.

A side pocket mandrel having such reverse check valves is shown in FIG. 23 and is indicated by the numeral 600. Mandrel 600 is very similar to the mandrel 20 of FIGS 9-A and 9-B except for its lateral porting which includes check valves mounted therein and seen in the cross-sectional view, FIG. 24. Mandrel 600 could be constructed like that of mandrel 430 of FIG. 17, if desired, or like any of the others described hereinabove, since this mandrel can be used with wireline as well as with pumpdown equipment.

FIG. 25 is a magnified view showing one of the check valves of FIG. 24. In this view the check valve assembly 662 is shown in position for preventing fluid flow from the exterior of the mandrel 600 into its receptacle bore 627. Mandrel body 600a is formed with a main bore 641 and a receptacle bore 627. A lateral passage 629 communicates the receptacle bore 627 with the region exterior of the mandrel.

Lateral passage 629 is enlarged at 630 to receive the check valve assembly 662, and this bore is provided with a suitable internal recess 677 in which a retainer ring such as snap ring 676 is disposed to hold the check valve assembly in place. A suitable back-up in the form of a washer-like disk 675 having a central aperture 675a which is substantially equal in size to passage 629 is disposed between the check valve and the snap ring to lend support to the check valve cage 664 which may be formed of plastic material.

Check valve assembly 662 is very similar to check valve assembly 462 previously described. Check valve cage 664 is provided with a bore 668 which is enlarged so at 669 and further enlarged at 669a to receive the seat member 666 and provides a shoulder 669b which stops the seat member 666 in the proper position in the cage as shown. The cage is provided with fingers 670b having internal bosses 671a like those of the check valve cage 464 previously decribed.

A ball 665 which may be exactly like ball 465, previously described, is disposed inside the cage 664 before the seat member 666 is inserted in bore 669a of the cage and is preferably a close fit therein. It is shouldered against shoulder 669b. If desired, the seat 666 can be more securely attached to the cage 664. This is particularly desirable if the cage and seat are to be made of a non-metallic material such as molded RYTON or VESPEL "SP-1" as mentioned hereinabove with respect to check valve assembly 462, in which case they are preferably bonded. In either case, the assembly forms a cartridge-like check valve device which is easily handled.

A seal ring such as o-ring 663 is placed about the seat 666 as shown to seal between it and the mandrel body 600a.

It is clear that the check valve assembly 662 will permit outflow from the receptacle bore but will prevent inflow.

It is now obvious that the check valve assembly 662, shown in reverse check position in FIG. 25, can be inverted or flopped end for end relative to the position shown in FIG. 26, in which position it serves as a regulating check valve like that illustrated in FIG. 19 and will prevent outflow. Thus, the check valve assembly 662 can be easily changed from the FIG. 25 position to the FIG. 26 position as required. This, then, has the advantage of stocking mandrels having lateral ports counterbored and recessed as shown in FIGS. 25 and 26 and stocking check valve assemblies such as the assembly 662. Mandrels can then be supplied with or without check valves, and with the check valves in the regular or reversed position. Further, mandrels used for one type of installation can be readily converted for another type of installation. Further, replacement or inversion of the check valves can be readily and easily accomplished in the field without necessity of sending the mandrels to a shop or to the factory.

Either of the check valve assemblies 462 or 662 is readily and inexpensively producible in the cartridge-like form which may be termed a cartridge-type check valve. This is especially true where the cage and seat are injection molded of RYTON or VESPEL "SP-1" and then telescoped together (and even bonded) with the stainless steel ball enclosed therein.

Thus, it has been shown that side pocket mandrels embodying this invention comprise a one-piece main body section having a side pocket receptacle bore machined therein alongside the main bore and that an upper body section is welded to the upper end of the main body section by a circumferential weld, this upper body section having a belly therein offset from the full opening main passage which extends straight through the mandrel from end to end and of which the main bore of the main body forms a part. It has been shown that the lower end of the main body section can be formed with means thereon for connection to a well tubing string and that it can alternatively be provided with a lower body section which is welded to the lower end thereof, adapting the main body for attachment to a well tubing string. Thus, the mandrels may comprise two or three body sections.

Additionally, it has been shown that these mandrels utilize only circumferential welds in their structural design and that these welds are strong, being able to withstand high differential pressures, internal or external, and further strengthened by the one-piece body section which is massive and which has a web between the main and receptable bores. Also, the circumferential welds used in these mandrels cause little distortion since the stresses resulting therefrom are distributed equally about the mandrel so that they are balanced and so that little or no straightening of the mandrel is subsequently required. The circumferential welds are fullpenetration welds, and they do not restrict or interfere with the flow passage through the mandrel. It should also be noted that these mandrels, while being stronger, are also economical to manufacture.

It has been shown that these mandrels may be provided with orienting means and/or deflector means, as desired, and that such means are welded inside the mandrel without using plug welds which require that a hole be made through the mandrel wall prepatory to such plug welding. Instead, the orienting means and deflector means are welded inside the mandrel by access through the end of the mandrel body, some such welding being done before the mandrel body sections are joined by circumferential welding, but some of which can be accomplished after assembling although this is not preferable. The light welds used for attaching the orienting means and the deflector means are shallow penetration welds and have little affect on the mandrel so far as distortion, stresses, and competence are concerned.

It has also been shown that these mandrels may be provided with the orienting means in their upper or lower ends depending upon the techniques to be used in installing and removing flow control devices used therein. If wireline techniques are to be employed, the orienting sleeve will generally be placed in the upper end of the mandrel. If pumpdown (TFL) techniques are to be used, the orienting means will be located below the upper end of the receptacle bore.

It should be understood that the main body section 120a, 220a, or 320a of side pocket mandrel 120, 220, or 320, respectively, like main body section 20a of side pocket mandrel 20, may be formed from a one-piece main body blank which has been produced by casting, forging, or similar process. Main body blanks produced by such processes may be cast or forged with the main bore therein. This main bore may or may not require finish machining, depending on the quality of the casting or forging. In either case, the claims appended hereto anticipate such side pocket mandrels and their method of construction, and such mandrels and methods for their construction are understood to fall within the scope of the appended claims.

It has been shown, too, that check valves can be provided in the lateral ports or passages of the side pocket mandrels discussed hereinabove for controlling fluid flow through the lateral ports; that the check valves can be installed to check outflow or inverted, that is turned end-for-end, to check inflow; that the check valve assemblies are readily installed or removed in the field without expert or factory help and, therefore, are readily changeable from inflow to outflow mode, or vice versa; that the check valves are readily and economically producible in cartridge form by attaching the seat to the cage with the ball trapped therebetween; that the seat and cage are ideally injection molded of suitable plastic material and assembled together to provide a cartridge-type check valve; and that the invertible check valve assembly simplifies manufacture, stocking, and inventory operations.

Further, it has been shown that full-penetration, homogeneous welds of superior quality and strength for high-pressure service can be achieved by permanently joining together a pair of tubular members using the methods set forth hereinabove; and that superior side pocket mandrels can be provided through use of the structures and methods of construction and methods of welding set forth hereinabove.

It also has been shown that the orienting sleeves and trip rings can be welded in place as described or secured in place by brazing such as is commonly done in a furnace, an induction furnace, or the like, which brazing operations are well-known. It is even anticipated that the deflectors might be secured in place by brazing if desired.

In either case, the term welding as applied to such orienting sleeves, trip rings, and deflectors includes brazing.

The foregoing description and drawings of the invention are explanatory and illustrative thereof, and various changes in sizes, shapes, materials, and arrangements of parts, as well as certain details of the illustrated construction, may be made within the scope of the appended claims without departing from the true spirit of the invention.

What is claimed is:

[1. A side pocket mandrel, comprising:

a. an elongate one-piece main body section having i. a main bore extending longitudinally therethrough, said main bore being full opening, ii. a machined receptacle bore therein extending alongside and offset from said main bore and open at its upper end, iii. lateral port means in said main body section communicating said receptacle bore with the exterior of said main body section, iv. means providing fluid communication between said main bore and said receptacle bore below the upper end thereof, and v. means for connecting the lower end of said main body section to a tubing string; and b. an upper body section welded to said main body section by a circumferential weld, said upper body section providing i. a main passage therethrough in alignment with the main bore of said main body section, ii. an offset belly therein in alignment with said receptacle bore providing space for operating a kickover tool for inserting a flow control device in said receptacle, and iii. means for connecting the upper end of said upper body section to a tubing string.]

[2. The side pocket mandrel of claim 1, including: orienting means in said mandrel above said belly and engageable by a kickover tool for orienting said kickover tool relative to said receptacle bore for inserting a flow control device therein or removing such a device therefrom.]

[3. The side pocket mandrel of claim 1, including:

a. orienting means in said mandrel below the upper end of said receptacle bore and engageable by a kickover tool for orienting said kickover tool relative to said receptacle bore for inserting a flow control device therein or removing such a device therefrom; and b. shoulder means in said mandrel above said belly and engageable by a kickover tool for activating said kickover tool.]

[4. The side pocket mandrel of claim 1, 2 or 3, including: deflector means in said belly of said mandrel engageable by regular well tools to deflect such tools into said main bore and away from said receptacle bore.]

[5. The side pocket mandrel of claim 4, wherein said lateral port means communicating said receptacle bore with the exterior of said main body section includes:

a. at least one lateral flow passage fluidly communicating the exterior of said main body section with said receptacle bore intermediate its ends; and b. check valve means in said lateral flow passage permitting fluid flow therethrough in one direction and preventing fluid flow therethrough in the opposite direction.]

[6. The side pocket mandrel of claim 5, wherein said check valve means includes:

a. check valve seat means having a seat surface thereon surrounding said lateral flow passage;

b. a check valve closure member engageable with said seat surface to prevent fluid flow through said lateral flow passage from said receptacle bore to the exterior of said side pocket mandrel and movable to a position of disengagement from said seat surface to permit fluid flow through said lateral flow passage in the opposite direction; and c. seal means engaged between said check valve seat means and said main body section to prevent leakage of fluids around said check valve seat means.]

[7. The side pocket mandrel of claim 5, wherein said check valve means includes:

a. check valve seat means having a seat surface thereon surrounding said lateral flow passage;

b. a check valve closure member engageable with said seat surface to prevent fluid flow through said lateral flow passage from the exterior of said side pocket mandrel into said receptacle bore and movable to a position of disengagement from said seat surface to permit flow through said lateral flow passage in the other direction; and c. seal means engaged between said check valve seat means and said main body section to prevent leakage of fluids around said check valve seat means.]

[8. A side pocket mandrel, comprising:

a. an elongate one-piece main body section having i. a main bore extending longitudinally therethrough, said main bore being full opening, ii. a machined receptacle bore therein extending alongside and offset from said main bore and open at its upper end, iii. lateral port means in said main body section communicating said receptacle bore with the exterior of said main body section, and iv. means providing fluid communicating between said main bore and said receptacle bore below the upper end thereof;

b. an upper body section welded to the upper end of said main body section by a circumferential weld, said upper body section providing i. a main passage therethrough in alignment with the main bore of said main body section, ii. an offset belly therein in alignment with said receptacle bore providing space for operating a kickover tool for inserting a flow control device in said receptacle, and iii. means for connecting the upper end of said upper body section to a tubing string; and c. a lower body section welded to the lower end of said main body section by a circumferential weld, said lower body section providing means for connecting the lower end of said lower body section to a tubing string.]

[9. The side pocket mandrel of claim 8, including: orienting means in said mandrel above said belly and engageable by a kickover tool for orienting said kickover tool relative to said receptacle bore for inserting a flow control device therein or removing such a device therefrom.]

[10. The side pocket mandrel of claim 8, including:

a. orienting means in said lower body section engageable by a kickover tool for orienting said kickover tool relative to said receptacle bore for inserting a flow control device therein or removing such a device therefrom; and b. shoulder means in said mandrel above said belly and engageable by a kickover tool for activating said kickover tool.]

[11. The side pocket mandrel of claim 8, 9, or 10, including: deflector means in said belly of said mandrel engageable by regular well tools to deflect such tools into said main bore and away from said receptacle bore.]

[12. The side pocket mandrel of claim 11, wherein said lateral port means communicating said receptacle bore with the exterior of said main body section includes:

a. at least one lateral flow passage fluidly communicating the exterior of said main body section with said receptacle bore intermediate its ends; and b. check valve means in said lateral flow passage permitting fluid flow therethrough in one direction and preventing fluid flow therethrough in the opposite direction.]

[13. The side pocket mandrel of claim 12, wherein said check valve means includes:

a. check valve seat means having a seat surface thereon surrounding said lateral flow passage;

b. a check valve closure member engageable with said seat surface to prevent fluid flow through said lateral flow passage from said receptacle bore to the exterior of said side pocket mandrel and movable to a position of disengagement from said seat surface to permit fluid flow through said lateral flow passage in the opposite direction; and c. seal means engaged between said check valve seat means and said main body section to prevent leakage of fluids around said check valve seat means.]

[14. The side pocket mandrel of claim 12, wherein said check valve means includes:

a check valve seat means having a seat surface thereon surrounding said lateral flow passage;

b. a check valve closure member engageable with said seat surface to prevent fluid flow through said lateral flow passage from the exterior of said side pocket mandrel into said receptacle bore and movable to a position of disengagement from said seat surface to permit flow through said lateral flow passage in the other direction; and c. seal means engaged between said check valve seat means and said main body section to prevent leakage of fluids around said check valve seat means.]

[15. A method of constructing a side pocket mandrel, comprising:

a. forming a main body section including the steps of i. forming an elongate solid body blank, ii. forming a full opening main bore lengthwise therethrough, iii. machining a receptacle bore in said body blank extending alongside said main bore, iv. providing at least one lateral flow passage in said body blank interconnecting said receptacle bore and the exterior of said body blank, v. providing means communicating said main bore with said receptacle bore below the upper end thereof, and vi. providing means on the lower end of said body blank for attachment to a tubing string;

b. forming an upper body section having a main passage therethrough and an offset belly therein for operating a kickover tool and means thereon for connecting said upper body section to a tubing string; and c. connecting said upper body section to said main body section by circumferentially welding the two sections together.]

[16. The method of claim 15, including the additional steps of:

a. forming orienting means for orienting a kickover tool for inserting flow control means in said receptacle bore and for removing such control means therefrom; and b. welding said orienting means in said upper body section above said belly in predetermined position relative to said receptacle bore.]

[17. The method of claim 15, wherein the steps of forming the main body section further include the step of forming orienting means in said main bore for orienting a kickover tool relative to said receptacle bore, and said steps for forming said upper body section includes the steps of forming a ring providing a stop shoulder thereon, and welding said ring in said upper body section with said stop shoulder in predetermined position relative to said receptacle bore, said welding being performed through an open end of said upper body section.]

[18. The method of claim 15, 16, or 17, further including the steps of:

a. forming deflector means for deflecting regular well tools into said main bore of said main body section and away from said receptacle bore; and b. welding said deflector means in said upper body section in predetermined position relative to said receptacle bore, said welding being performed through the open lower end of said upper body section before said upper body section is welded to said main body section.]

[19. The method of claim 18, wherein said at least one lateral flow passage interconnects the exterior of the body blank with the receptacle bore at a location intermediate its ends, and further including the step of: mounting check valve means in each said lateral flow passage to permit fluid flow therethrough in one direction and to prevent fluid flow therethrough in the opposite direction.]

[20. A method of constructing a side pocket mandrel, comprising:

a. forming a main body section including the steps of i. forming an elongate solid body blank, ii. forming a full opening main bore lengthwise therethrough, iii. machining a receptacle bore in said body blank extending alongside said main bore, iv. providing at least one lateral flow passage in said body blank interconnecting said receptacle bore and the exterior of said body blank and, v. providing means communicating said main bore with said receptacle bore below the upper end thereof;

b. forming an upper body section having a main passage therethrough and an offset belly therein for operating a kickover tool and means thereon for connecting said upper body section to a tubing string;

c. forming a lower body section having a main passage therethrough and means thereon for connecting said lower body section to a tubing string; and d. connecting said upper body section to the upper end of said body section and connecting said lower body section to the lower end of said main body section by circumferentially welding the adjacent body sections together.]

[21. The method of claim 20, including the additional steps of:

a. forming orienting means for orienting a kickover tool for inserting flow control means in said receptacle bore and for removing such control means therefrom; and b. welding said orienting means in said upper body section above said belly in predetermined position relative to said receptacle bore.]

[22. The method of claim 20, including the steps of:

a. forming orienting sleeve means for orienting a kickover tool relative to said receptacle bore for inserting a flow control device therein or removing such a device therefrom;

b. welding said orienting sleeve means in said mandrel below the upper end of said receptacle bore and in predetermined position relative thereto;

c. forming a ring providing a stop shoulder thereon engageable by a kickover tool; and d. welding said ring in said upper body section above said belly with said stop shoulder in predetermined position relative to said receptacle bore, said welding being performed through the open end of the upper tubing section.]

[23. The method of claim 20, 21, or 22, further including the steps of:

a. forming deflector means for deflecting regular well tools into said main bore of said main body section and away from said receptacle bore; and b. welding said deflector means in said upper body section in predetermined position relative to said receptacle bore, said welding being performed through the open lower end of said upper body section before said upper body section is welded to said main body section.]

[24. The method of claim 23 wherein said at least one lateral flow passage interconnects the exterior of the body blank with the receptacle bore at a location intermediate its ends, and further including the step of: mounting check valve means in each said lateral flow passage to permit fluid flow therethrough in one direction and to prevent fluid flow therethrough in the opposite direction.]

25. The method of joining a pair of tubular members in coaxial relationship by a circumferential weld, comprising:

a. facing the end of the first of said pair of tubular members to provide a planar end surface normal to its longitudinal axis;

b. counterboring the faced end of said first member to provide an internal recess terminating with a sloping surface spaced from said faced end and converging in the opposite direction therefrom;

c. chamfering the faced end of said first member externally, said chamfer leaving a narrow portion of said planar end surface to be abutted by a corresponding planar surface of the second of said pair of tubular members when mated therewith for welding;

d. facing the end of the second of said pair of tubular members to provide a first planar surface;

e. reducing the outside dimension of said first planar surface to form a short extension on the end of said second tubular member and a second planar surface surrounding said extension and being parallel to said first planar surface, said extension being dimensioned to fit relatively closely in said counterbore of said first tubular member;

f. counterboring the faced end of said second member to form an internal recess terminating with a sloping surface spaced from said faced end and converging in the opposite direction therefrom;

g. chamfering the end of said second member externally reducing the width of said second planar surface, the dimensions of said second planar surface substantially equaling those of said planar surface remaining on said first tubular member;

h. mating said pair of tubular members with their planar surfaces fully abutting one another, the chamfers of said pair of tubular members together forming an external recess with inwardly convergent walls extending about said pair of members;

i. tack welding the mated tubular members together at spaced intervals thereabout;

j. welding said pair of tubular members together by making a series of welding passes thereabout starting in the bottom of the external recess and continuing until the recess is more than filled with weld metal, said projection on said second tubular member being substantially melted during the welding operation, said weld leaving the bore of said pair of tubular members unrestricted thereby.

26. The method of claim 25 including the additional step of: chamfering the inner edge of said second tubular member, substantially removing the remaining portion of said first planar surface.

27. The method of claim 25 including the additional step of: rounding the inner edge of said second tubular member, substantially removing the remaining portion of said first planar surface.

28. The method of claim 25, 26, or 27, including the further step of removing the excess weld metal to a level flush with the exterior of said pair of tubular members.

29. The method of claim 25, 26, or 27 wherein said chamfers on said pair of tubular members are so shaped that said external recess formed thereby when said tubular members are assembled has a profile comprising convergent side walls connected to a substantially flat bottom by arcuate lines.

30. The method of claim 29, including the further step of removing the excess well metal to a level flush with the exterior of said pair of tubular members.

31. A side pocket mandrel comprising a plurality of tubular body sections joined together by one or more circumferential welds made in accordance with the method of claim 25, 26, or 27, one of said tubular body sections being an elongate one-piece section having a main bore extending therethrough and a receptacle bore extending alongside said main bore.

32. A side pocket mandrel comprising a plurality of tubular body sections joined together by one or more circumferential welds made in accordance with the method of claim 28, one of said tubular body sections being an elongate one-piece section having a main bore extending therethrough and a receptacle bore extending alongside said main bore.

33. A side pocket mandrel comprising a plurality of tubular body sections joined together by one or more circumferential welds made in accordance with the method of claim 29, one of said tubular body sections being an alongate one-piece section having a main bore extending therethrough and a receptacle bore extending alongside said main bore.

34. A side pocket mandrel comprising a plurality of tubular body sections joined together by one or more circumferential welds made in accordance with the method of claim 30, one of said tubular body sections being an alongate one-piece section having a main bore extending therethrough and a receptacle bore extending alongside said main bore.

* * * * *